(12) United States Patent
Sugiyama

(10) Patent No.: US 10,462,324 B2
(45) Date of Patent: Oct. 29, 2019

(54) IMAGE SENSOR UNIT, PAPER SHEET DISTINGUISHING APPARATUS, READING APPARATUS, AND IMAGE FORMING APPARATUS

(71) Applicant: CANON COMPONENTS, INC., Kodama-gun, Saitama (JP)

(72) Inventor: Takeshi Sugiyama, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/958,523

(22) Filed: Apr. 20, 2018

(65) Prior Publication Data

US 2018/0309896 A1 Oct. 25, 2018

(30) Foreign Application Priority Data

Apr. 24, 2017 (JP) ................................. 2017-085666

(51) Int. Cl.
*H04N 1/028* (2006.01)
*H04N 1/10* (2006.01)
(Continued)

(52) U.S. Cl.
CPC ......... *H04N 1/02855* (2013.01); *G02B 6/009* (2013.01); *G02B 6/0025* (2013.01); *G02B 6/0055* (2013.01); *G02B 6/0088* (2013.01); *G02B 7/02* (2013.01); *G02B 13/0095* (2013.01); *G02B 19/0047* (2013.01); *H04N 1/00795* (2013.01); *H04N 1/02835* (2013.01); *H04N 1/0306* (2013.01); *H04N 1/0315* (2013.01); *H04N 1/0318* (2013.01); *H04N 1/103* (2013.01); *H04N 1/1043* (2013.01); *H04N 1/191* (2013.01); *H04N 1/1933* (2013.01);
(Continued)

(58) Field of Classification Search
CPC .............. G02B 19/0047; G02B 6/0025; H04N 1/00795; H04N 1/02855; H04N 1/1043
USPC .................................................. 358/475, 509
See application file for complete search history.

(56) References Cited

U.S. PATENT DOCUMENTS

| | | | | |
|---|---|---|---|---|
| 5,189,493 A | * | 2/1993 | Harding | ............... G01B 11/254 |
| | | | | 250/237 G |
| 5,343,227 A | * | 8/1994 | Hirosawa | ................ B41J 2/155 |
| | | | | 346/139 R |

(Continued)

FOREIGN PATENT DOCUMENTS

JP 2009164743 A 7/2009

*Primary Examiner* — Negussie Worku
(74) *Attorney, Agent, or Firm* — Rossi, Kimms & McDowell LLP

(57) ABSTRACT

An image sensor unit includes a light condenser that collects light from a reading target object; an image sensor that receives light and converts the light into an electric signal; an elongated housing that houses the light condenser and the image sensor; and an elongated rigid member attached to a side surface extending in the elongated direction of the housing. The side surface of the housing is provided with an attachment protrusion. The rigid member is provided with an attachment hole that penetrates from a surface facing the side surface of the housing to a non-facing surface on the opposite side, and the non-facing surface of the rigid member is provided with a concave. The attachment protrusion is inserted into the attachment hole, and a part of the attachment protrusion is fit into the concave.

15 Claims, 19 Drawing Sheets

(51) Int. Cl.
  *H04N 1/00* (2006.01)
  *G02B 13/00* (2006.01)
  *H04N 1/031* (2006.01)
  *H04N 1/193* (2006.01)
  *F21V 8/00* (2006.01)
  *G02B 19/00* (2006.01)
  *G02B 7/02* (2006.01)
  *H04N 1/03* (2006.01)
  *H04N 1/191* (2006.01)

(52) U.S. Cl.
  CPC ... *H04N 1/1934* (2013.01); *H04N 2201/0094* (2013.01); *H04N 2201/02404* (2013.01)

(56) References Cited

U.S. PATENT DOCUMENTS

| | | | | |
|---|---|---|---|---|
| 5,992,822 | A | * | 11/1999 | Nakao .............. F16K 31/0655 251/129.15 |
| 6,707,584 | B1 | * | 3/2004 | Morita .............. H04N 1/00538 358/474 |
| 8,817,344 | B2 | * | 8/2014 | Takahara .............. H04N 1/1017 358/497 |
| 2004/0216280 | A1 | * | 11/2004 | Tetsumoto .......... C21B 13/0046 23/314 |
| 2008/0286518 | A1 | * | 11/2008 | Kiyota .............. H04N 1/1017 428/57 |
| 2013/0181311 | A1 | * | 7/2013 | Sugiyama .............. H04N 1/193 257/432 |
| 2018/0152584 | A1 | * | 5/2018 | Sugiyama .............. H04N 1/047 |
| 2018/0246228 | A1 | * | 8/2018 | Nakamura .............. G01T 1/2018 |
| 2018/0272712 | A1 | * | 9/2018 | Nakayama .............. B41J 2/1643 |
| 2019/0168525 | A1 | * | 6/2019 | Yoshida .............. B41J 29/393 |

* cited by examiner

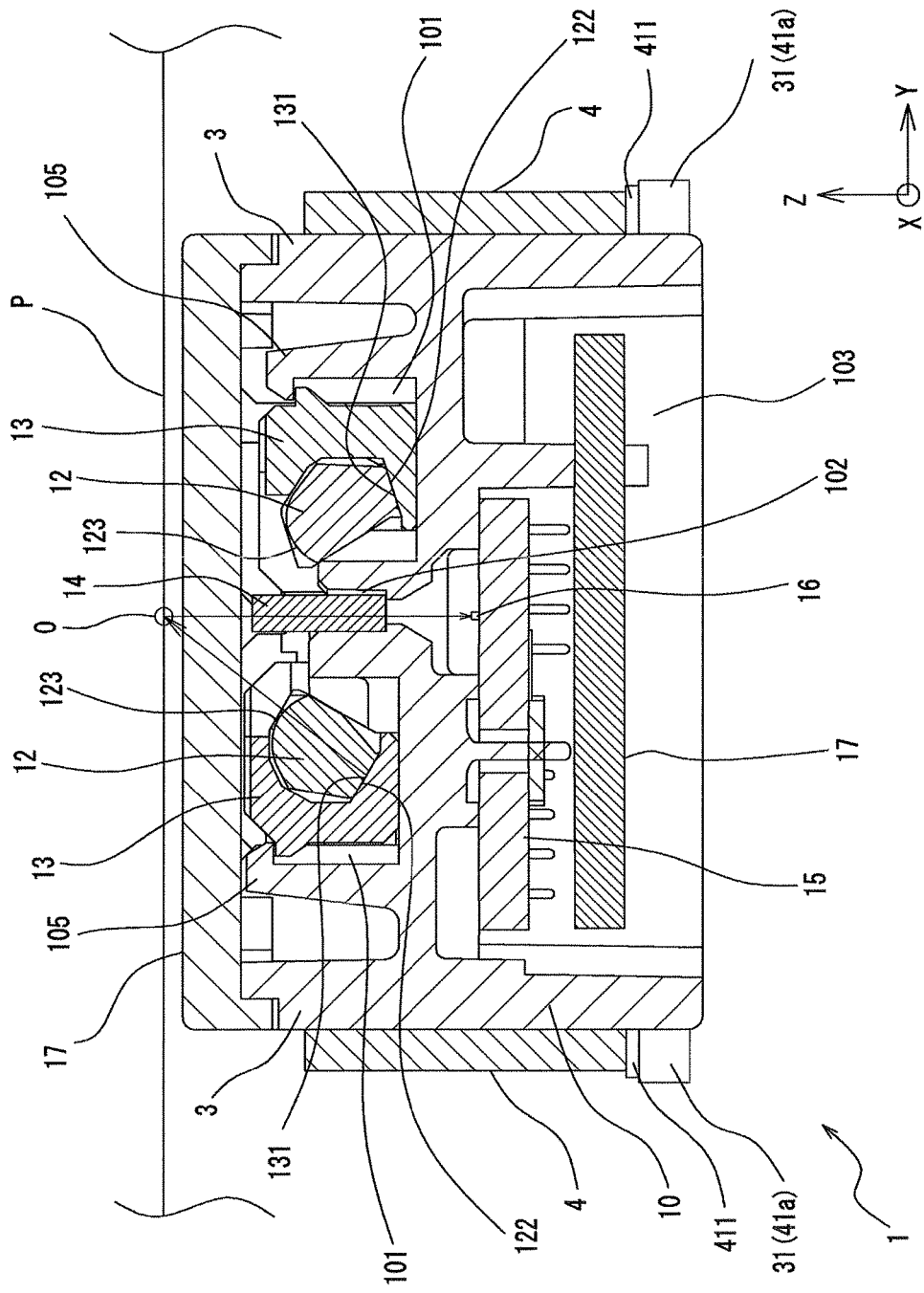

F I G. 4A
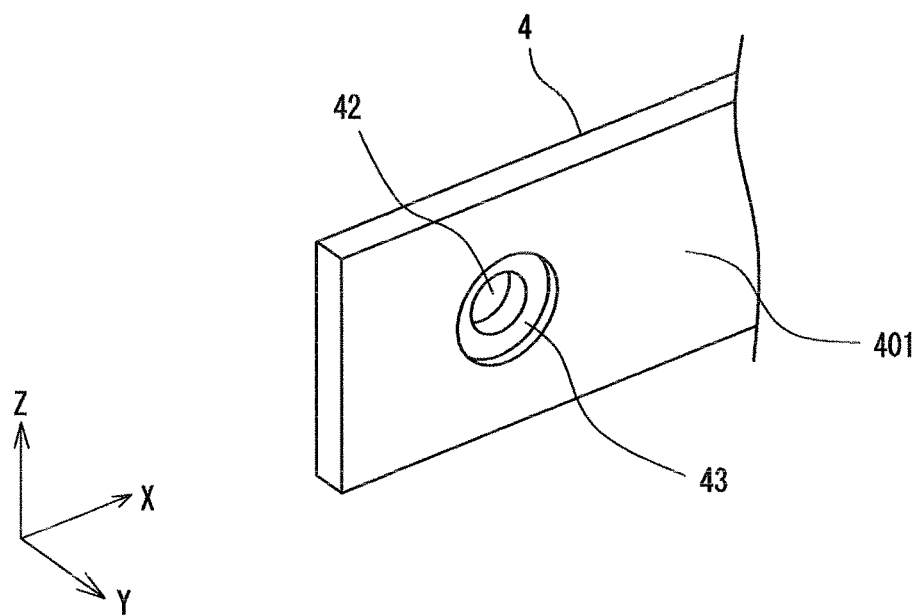
F I G. 4B
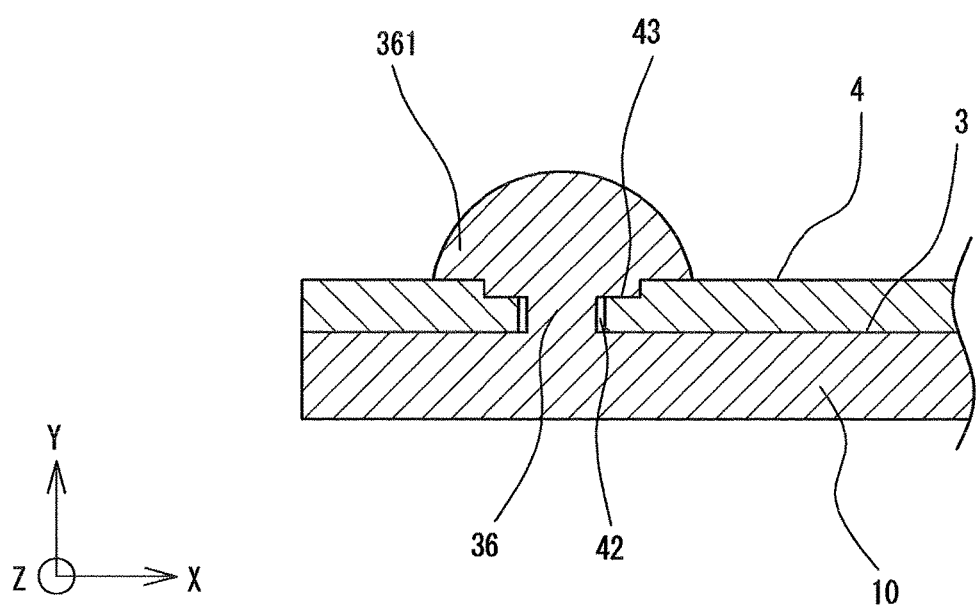

F I G. 11
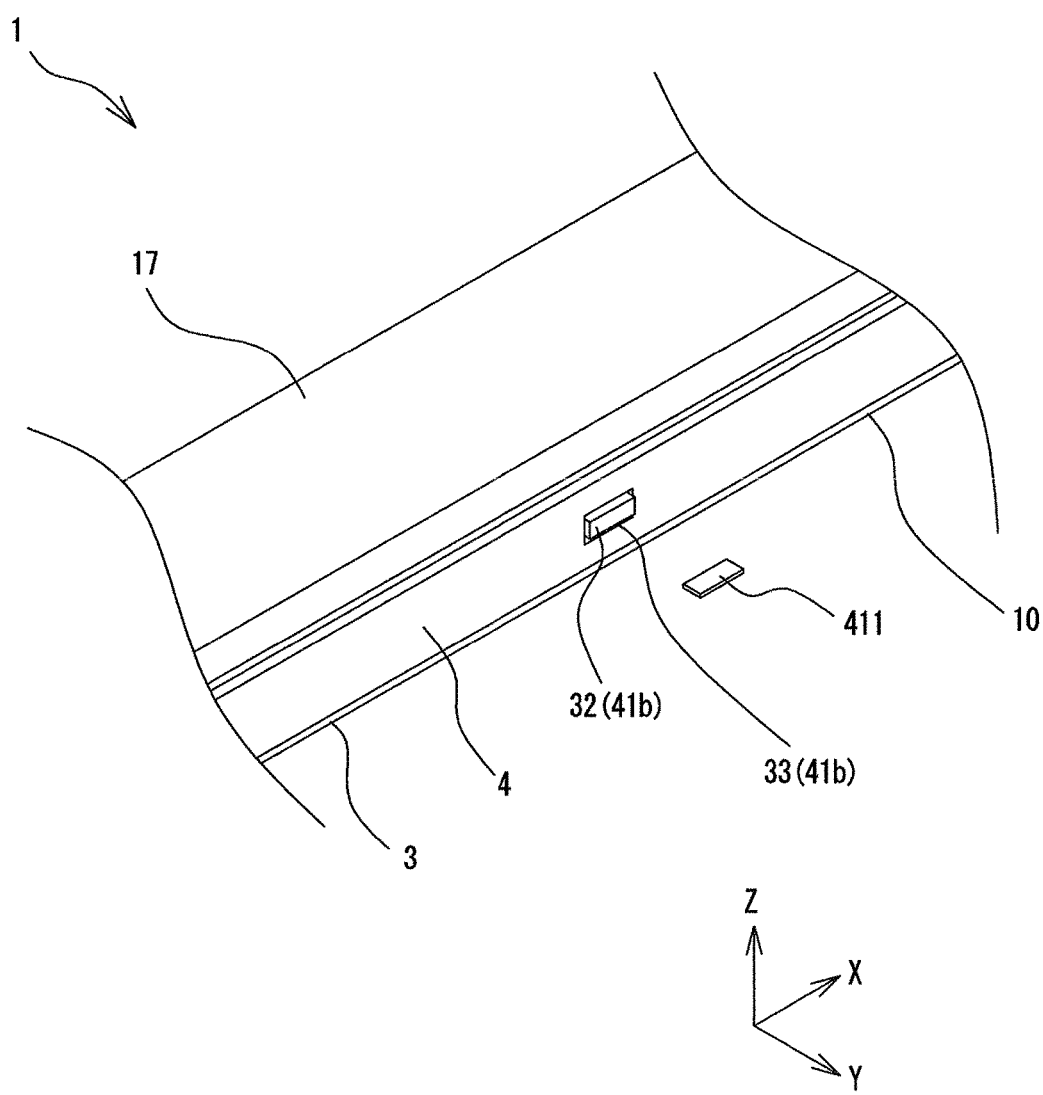

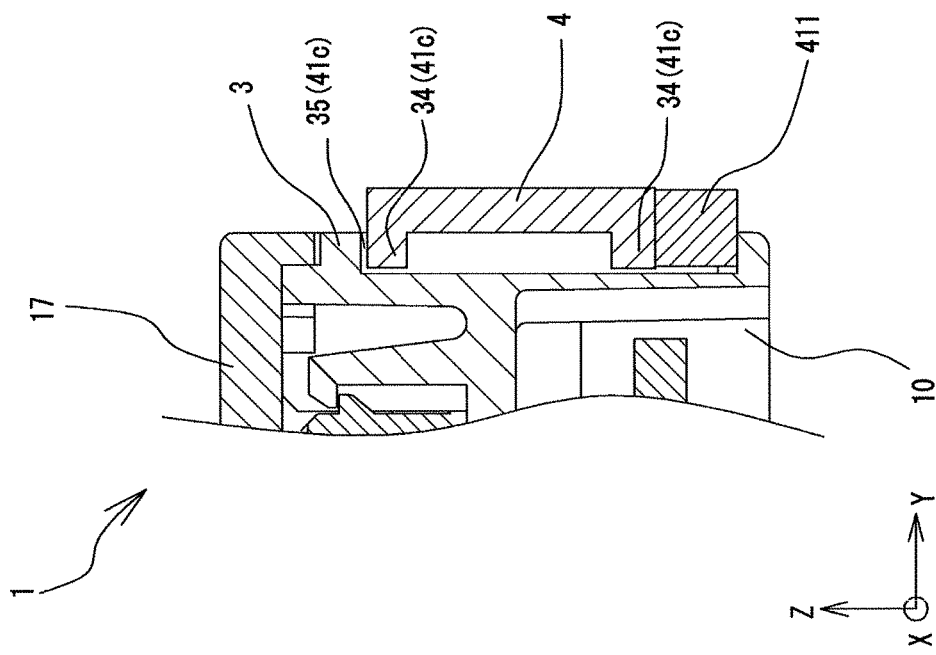
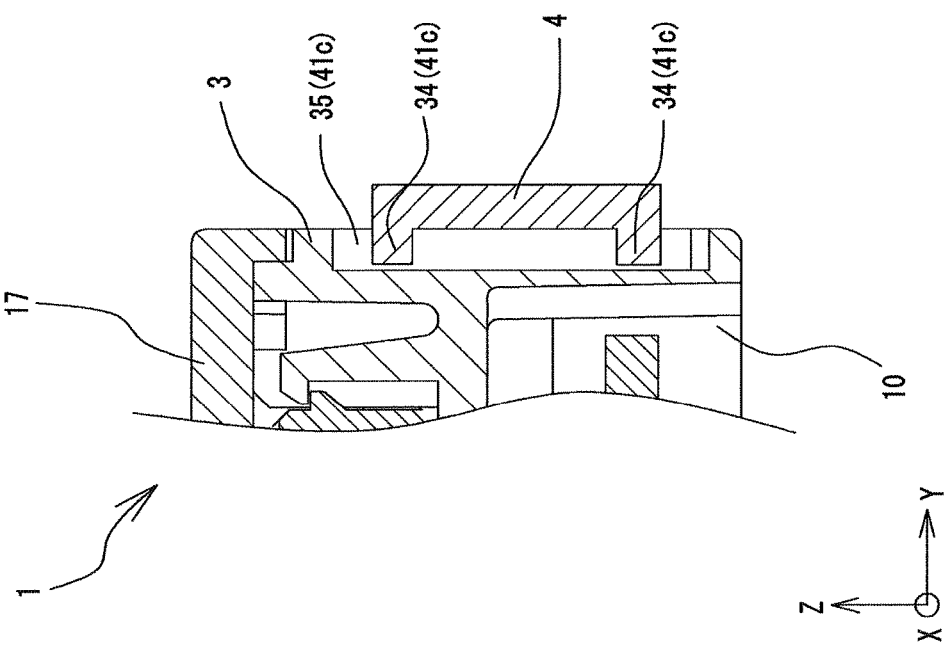

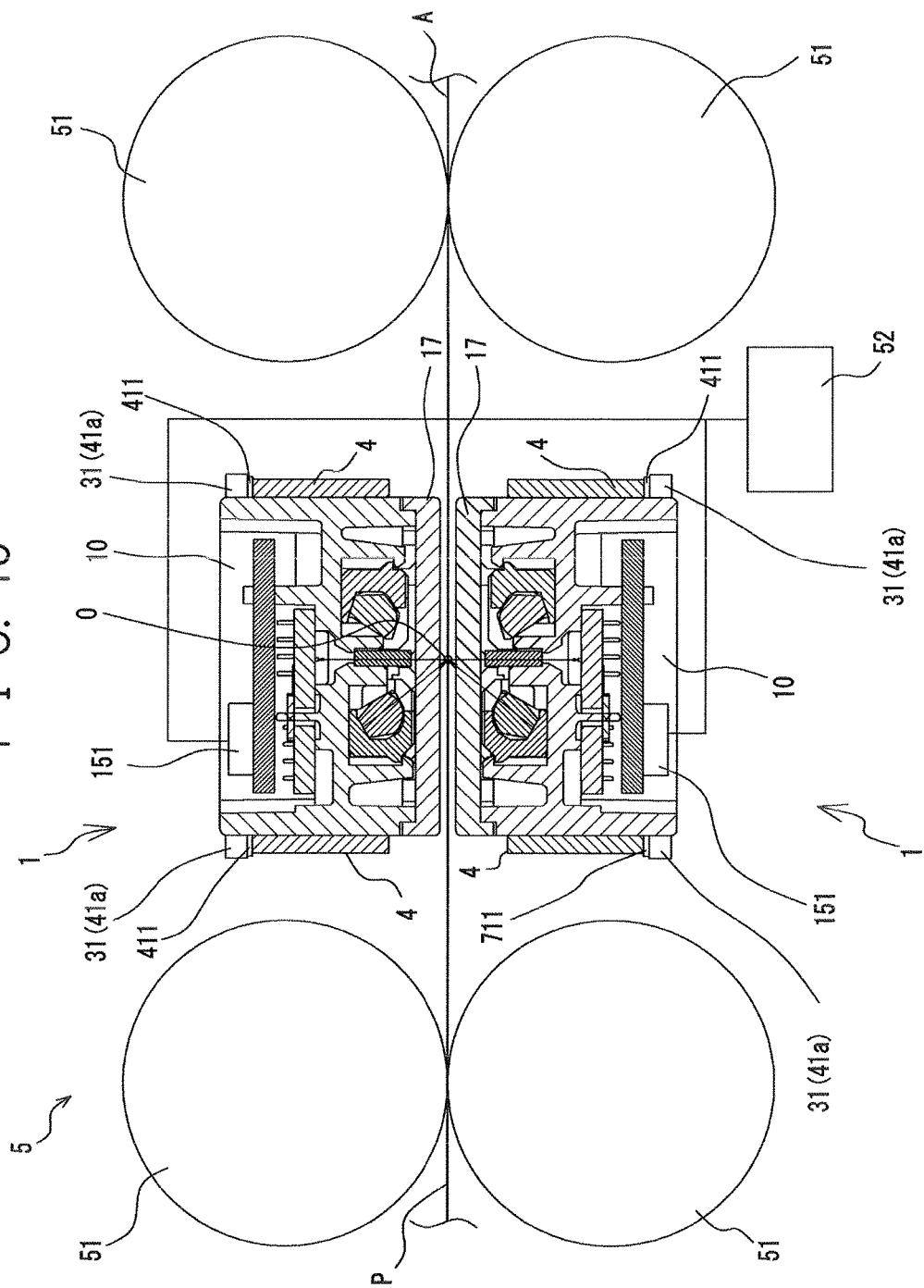

IMAGE SENSOR UNIT, PAPER SHEET DISTINGUISHING APPARATUS, READING APPARATUS, AND IMAGE FORMING APPARATUS

CROSS-REFERENCE TO RELATED APPLICATIONS

This application is based upon and claims the benefit of priority of the prior Japanese Patent Application No. 2017-085666, filed on Apr. 24, 2017, the entire contents of which are incorporated herein by reference.

BACKGROUND OF THE INVENTION

Field of the Invention

The present invention relates to an image sensor unit, a paper sheet distinguishing apparatus, a reading apparatus, and an image forming apparatus.

Description of the Related Art

There are reading apparatuses, such as scanners, and image forming apparatuses, such as copiers and MFPs (Multifunction Printers), to which an elongated rod-like image sensor unit is applied. Such a reading apparatus and an image forming apparatus move the image sensor unit and a reading target relatively in a predetermined direction while causing the image sensor unit to read the reading target. Such image sensor units are used with the units being intentionally warped (curved) to have a distance to the reading target object that is intentionally uneven when viewed in the predetermined direction, in some cases. In this case, it is preferable to hold a desired warping amount so as to prevent the warping amount from varying after adjustment. Accordingly, there is a demand for holding the adjusted warping amount so as not to vary after the warping amount of the image sensor unit is adjusted.

Patent Document 1 discloses a configuration including a cam mechanism, as a configuration of adjusting the distance between the image sensor unit and the reading target object. Such a configuration can adjust the distance to the reading target by turning a cam for each individual image sensor unit. However, Patent Document 1 does not disclose a configuration for adjusting and holding the warping amount of the image sensor unit.

Patent Document 1

Japanese Laid-open Patent Publication No. 2009-164743

SUMMARY OF THE INVENTION

In view of the above described situation, the present invention has an object to facilitate reduction in the warping amount of the image sensor unit.

To solve the problem described above, the present invention is an image sensor unit that reads a reading target object by receiving light from the reading target object, this unit includes: a light condenser that collects light from the reading target object; an image sensor that receives the light collected by the light condenser and converts the received light into an electric signal; an elongated housing that houses the light condenser and the image sensor; and an elongated rigid member that is provided on a side surface elongated in an elongated direction of the housing, wherein the side surface of the housing is provided with a protrusion, the rigid member is provided with a penetration-hole that penetrates from a surface facing the side surface of the housing through an opposite surface thereof, and the opposite surface of the rigid member is provided with a concave, the protrusion provided for the housing is inserted into the penetration-hole provided for the rigid member, and a part of the protrusion provided for the housing is fit into the concave provided for the rigid member.

BRIEF DESCRIPTION OF THE DRAWINGS

FIG. 3 is a diagram showing a sectional view of the image sensor unit 1 taken along a plane perpendicular to a main-scan direction;

FIG. 4A is a diagram illustrating the attachment structure of a rigid member according to a first example;

FIG. 4B is a diagram illustrating the attachment structure of a rigid member according to a first example;

FIG. 11 is a perspective view schematically showing a configuration of a warping amount adjusting part according to a second example;

FIG. 13A is a sectional view schematically showing a configuration of a warping amount adjusting part according to a third example;

FIG. 13B is a sectional view schematically showing the configuration of the warping amount adjusting part according to the third example;

FIG. 16 is a diagram schematically showing a configuration example of an essential part of a paper sheet distinguishing apparatus;

DETAILED DESCRIPTION OF THE PREFERRED EMBODIMENTS

Hereinafter, embodiments to which the present invention is applicable are described in detail with reference to the drawings. The embodiments of the present invention describe an image sensor unit, and a paper sheet distinguishing apparatus, a reading apparatus and an image forming apparatus to which the image sensor unit is applied. The image sensor unit according to the embodiment of the present invention is used with its predetermined side being oriented toward a reading target object. The image sensor unit then receives and photoelectrically converts light (reflected light or transmission light from the target object P) entering the predetermined side from the reading target object, and generates an image signal (image data) of the reading target object. The image sensor unit according to the embodiment of the present invention includes what is called a line sensor, and receives and photoelectrically converts one-dimensional light (linear light). The image sensor unit according to the embodiment of the present invention receives the linear light while relatively moving with respect to the reading target object, thereby allowing a two-dimensional image signal (image data) of the reading target object to be generated.

In each diagram, the three-dimensional directions of the image sensor unit are indicated by X, Y and Z arrows. The X direction is the elongated direction of the image sensor unit, and is, for example, the main-scan direction (the arrangement direction of multiple light receiving parts in the line sensor). The Y direction is one short-hand direction of the image sensor unit (the direction perpendicular to the elongated direction and the light incident direction) and is, for example, the sub-scan direction (the relative movement direction with respect to the reading target object during usage). The Z direction is the other short-hand direction of the image sensor unit (the same direction as the light incident direction). For the sake of convenience of description, the Y direction is referred to as the width direction, and the Z direction is referred to as the vertical direction. As for the vertical direction, a side toward the reading target object (the light incident side) is referred to as the upper side, and the opposite side is referred to as the lower side.
<Configuration Example of Image Sensor Unit>

Figure 1:
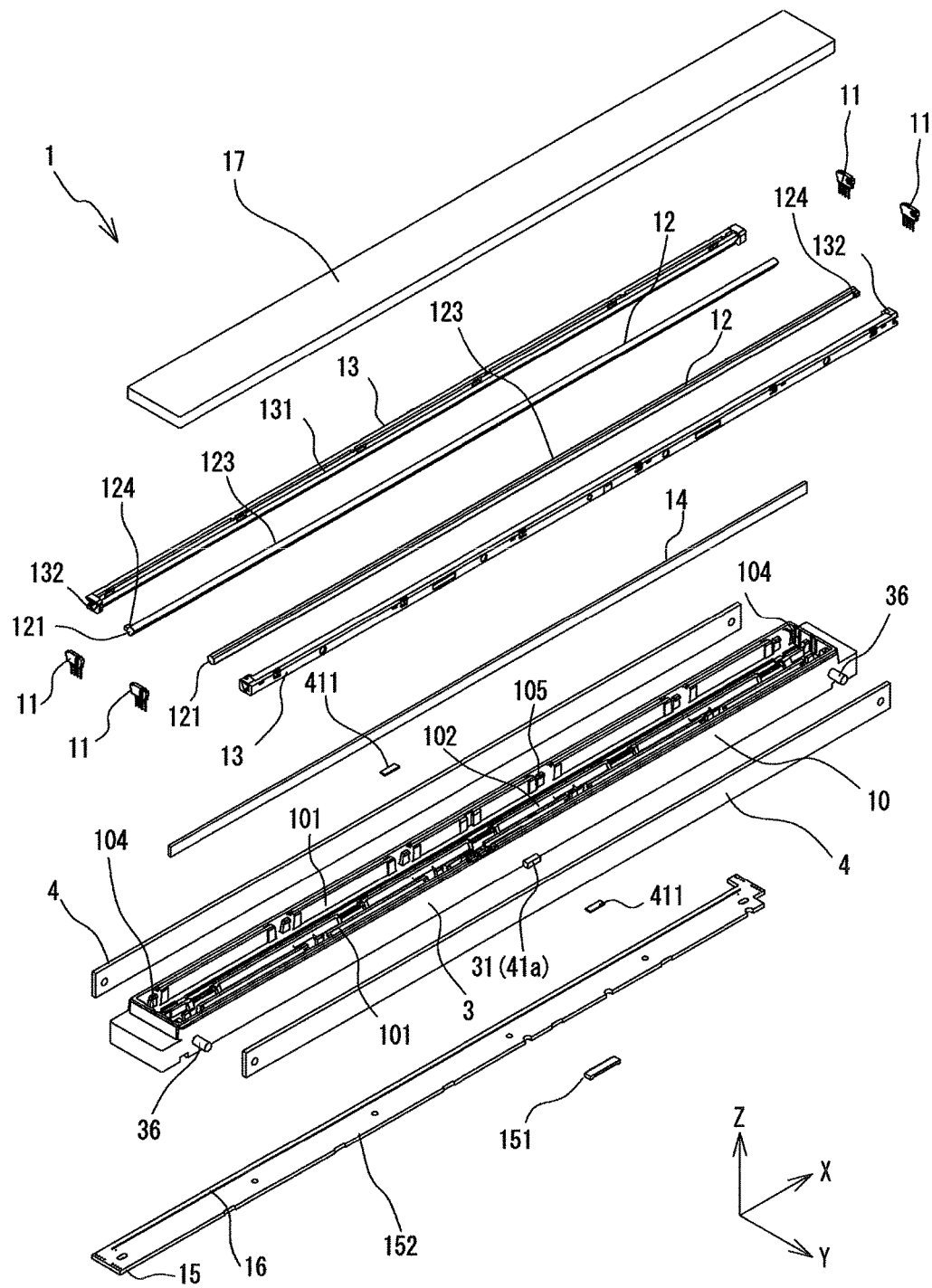
FIG. 1 is an exploded perspective view schematically showing a configuration example of an image sensor unit.
Figure 2:
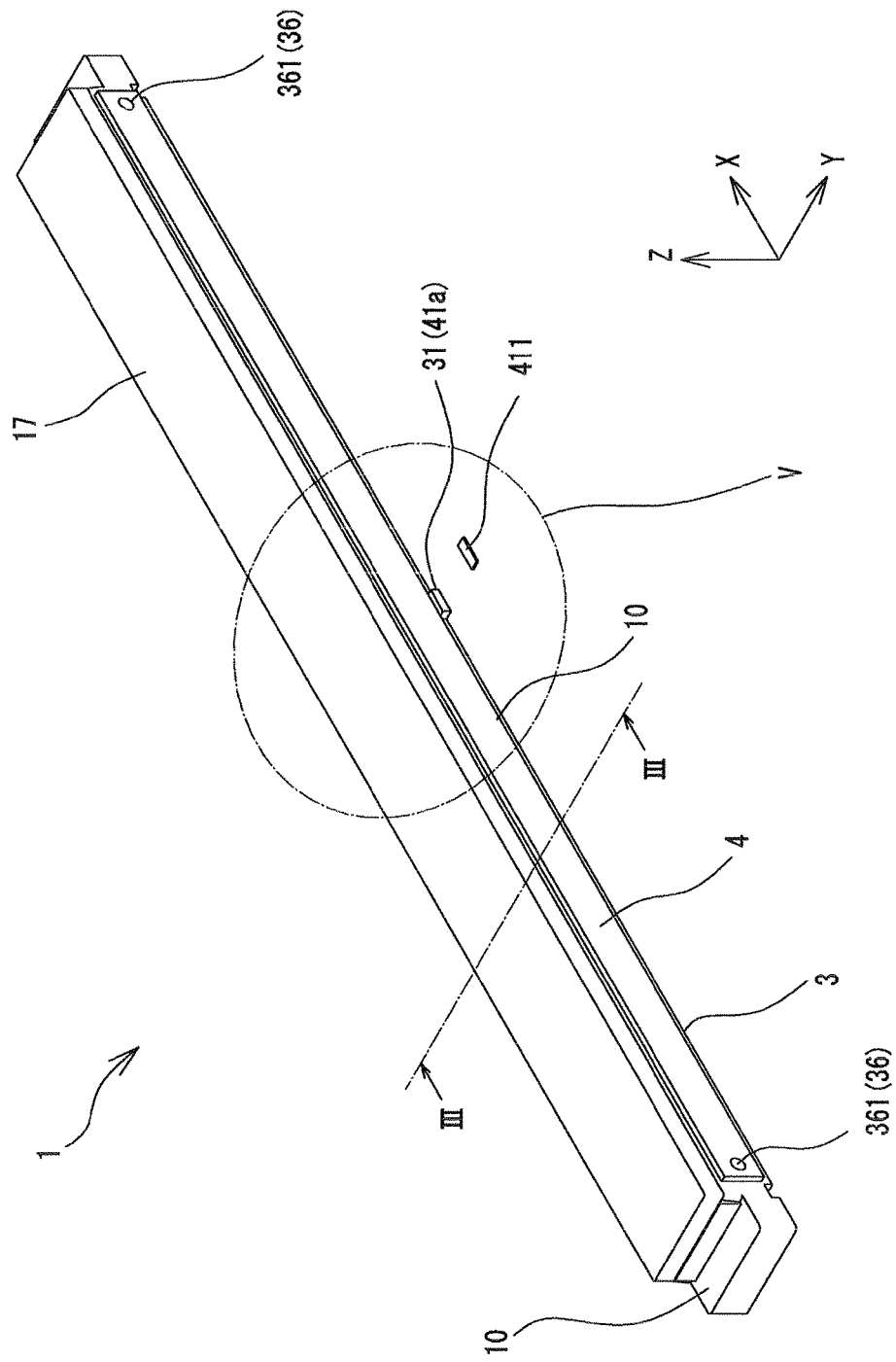
FIG. 2 is a perspective view of an appearance schematically showing the configuration example of the image sensor unit.

First, a configuration example of the image sensor unit 1 is described with reference to FIGS. 1 to 3. FIG. 1 is an exploded perspective view schematically showing the configuration example of the image sensor unit 1. FIG. 2 is a perspective view of an appearance schematically showing the configuration example of the image sensor unit 1. FIG. 3 is a sectional view taken along line III-III of FIG. 2, and is a sectional view taken along a plane perpendicular to the elongated direction of the image sensor unit 1. As shown in FIGS. 1 to 3, the image sensor unit 1 includes a housing 10, light sources 11, light guides 12, light guide covers 13, a light condenser 14, a sensor substrate 15, and a body cover 17. The image sensor unit 1 further includes: rigid members 4 for adjusting the warping amount (more specifically, the warping amount in the vertical direction when viewed in the Y direction) of the housing 10; and warping amount adjusting members 411.

Any of various point-like light sources, such as LED packages including LED elements, is applied as the light source 11. For example, an LED package including LED elements with emission light colors red (R), green (G), blue (B) and infrared (Ir) (wavelength ranges) is applied as the light source 11. Note that the configuration and the light emission colors of the light source 11 are not particularly limited. For example, the light source 11 may have a configuration to which an LED package including LED elements having a single type of light emission color (wavelength range) is applied. The light source 11 is not limited to the LED package.

The light guide 12 is an optical member for linearizing light emitted from the light source 11 (achieving a linear light source) and emitting the linearized light to the outside of the image sensor unit 1 (toward the reading target object P (see FIG. 3)). The light guide 12 is made of a transparent material, for example, acrylic resin, and has an elongated rod-like shape as a whole. A light incident surface 121 which the light emitted from the light source 11 has entered is provided on one or both of the end surfaces in the elongated direction of the light guide 12. FIG. 1 shows an example of a configuration where the light incident surfaces 121 are provided on both the end surfaces. On side surfaces of the light guide 12, a later-described light diffusion surface 122 (see FIG. 3) and a light emission surface 123 are provided. The light guide 12 is provided with an engagement part 124 for positioning with respect to the light guide cover 13. For example, a projection that is provided at an end in the elongated direction and protrudes in the width direction is applicable as the engagement part 124.

The light diffusion surface 122 of the light guide 12 is a surface that is for diffusing light having entered the light incident surface 121 and has a shape elongated in the elongated direction of the light guide 12. For example, a prism pattern (now shown) for emitting light outside of the light guide 12 is formed on the light diffusion surface 122. For example, a convex structure that has a substantially triangular section and extends in the direction orthogonal to the elongated direction is applicable to the prism pattern. Furthermore, the light diffusion surface 122 has a configuration where a dot pattern or the like for diffusing light is printed thereon. The light emission surface 123 is a surface from which the light having entered the light incident surface 121 is emitted toward the reading target object P. The light emission surface 123 has a shape elongated in the elongated direction of the light guide 12 so as to linearize light to be emitted from the light source 11 (achieve a linear light source).

FIG. 1 shows the configuration where the light incident surfaces 121 are provided on both the end surfaces in the elongated direction (main-scan direction) of the light guide 12. Alternatively, a configuration where the light incident surface 121 is provided only on one end surface may be adopted. FIGS. 1 and 3 show the configuration where the image sensor unit 1 includes two light guides 12. However, the number of light guides 12 included in the image sensor unit 1 is not limited thereto. For example, the image sensor unit 1 may have a configuration that includes a single light guide 12. Alternatively, this unit may have a configuration that includes three or more light guides 12.

The light guide cover 13 is a member that is attached to the light guide 12. The light guide cover 13 has an elongated rod-like shape, and its sectional shape taken along a plane perpendicular to the elongated direction is a substantially "U" shape or substantially "C" shape. The light guide cover 13 has a function of diffusing light, and a function of facilitating improvement in light utilization efficiency, and is formed of a material having a high light reflectance, such as polycarbonate in which titanium oxide in powder is mixed, for example. A light reflection surface 131 is provided in the light guide cover 13. The light reflection surface 131 is a surface that is for reflecting light emitted from the light diffusion surface 122 of the light guide 12 to the outside and causing the light to re-enter the inside of the light guide 12. The light reflection surface 131 has a shape elongated in the main-scan direction like the light diffusion surface 122 of the light guide 12. A part of the inner surface of the light guide cover 13 may be the light reflection surface 131, or the entire inner surface may be the light reflection surface 131. When the light guide cover 13 is attached to the light guide 12, the light reflection surface 131 of the light guide cover 13 covers the light diffusion surface 122 of the light guide 12 (the light reflection surface 131 provided for the light guide cover 13 faces the light diffusion surface 122 provided on the side surface of the light guide 12).

Engagement target parts 132 with which the engagement parts 124 of the light guide 12 can be engaged are provided in proximity to the ends of the light guide cover 13 in the elongated direction. In the case where the projections are applied as the engagement parts 124 of the light guide 12, openings or concaves with which the respective engagement parts 124 can be engaged, for example, are applied as the engagement target parts 132 provided for the light guide cover 13. When the engagement parts 124 provided for the light guide 12 are engaged with the engagement target parts 132 provided for the light guide cover 13, the light guide 12 and the light guide cover 13 are held in a state of being positioned with respect to each other.

The light condenser 14 is an optical member that focuses (collects) the light from the reading target object P on the surface of the image sensor 16 (described later). For example, a typical rod lens array or microlens array is applicable as the light condenser 14. A typical rod lens array has a plurality of imaging elements (rod lenses) of an erect equal magnification imaging type linearly arranged in the elongated direction. The light condenser 14 may be any configuration only if this condenser can focus (collect) the linear light elongated in the elongated direction (main-scan direction) on the surface of the image sensor 16. The configuration is not specifically limited.

The sensor substrate 15 includes a wiring board 152, an image sensor 16 provided on the wiring board 152, and the light source 11. The sensor substrate 15 may include a connector 151 for electrical connection to the outside. The wiring board 152 has an elongated plate shape, for example. The configuration of the wiring board 152 is not specifically limited. Any of publicly known various wiring boards, such as publicly known printed circuit boards is applicable.

The image sensor 16 receives light (light from the reading target object P) focused by the light condenser 14, and converts the light into an electric signal. The image sensor 16 includes multiple photoelectric conversion elements (sometimes called light receiving elements) that are linearly (one-dimensionally) arranged. For example, an image sensor IC array is applicable as the image sensor 16. The image sensor IC array is formed with multiple image sensor ICs being mounted on the upper surface of the wiring board 152 in a manner linearly arranged. Each image sensor IC includes multiple photoelectric conversion elements that are linearly arranged. The configuration of the image sensor 16 is not specifically limited, only if the configuration includes linearly arranged (one-dimensional) photoelectric conversion elements. For example, the number and intervals of the photoelectric conversion elements included in the image sensor 16 are appropriately set according to the specification of the image sensor unit 1. In the configuration where the image sensor IC array is applied to the image sensor 16, the configuration of the image sensor IC that forms the image sensor IC arrays is not specifically limited either. Any of various types of image sensor ICs having already been known is applicable. Furthermore, in the case where the image sensor IC array is applied to the image sensor 16, the image sensor ICs may be arranged in multiple arrays in a staggered manner.

The housing 10 is a housing of the image sensor unit 1, and has an elongated shape. The housing 10 is formed of a material having a light blocking property. For example, any of various resin materials, such as black-painted polycarbonate, is applicable as the material of the housing 10. The housing 10 includes, light guide housing parts 101, a light condenser housing part 102, a sensor substrate housing part 103, and light source housing parts 104. The light guide housing part 101 is a region that can house the light guide 12 to which the light guide cover 13 is attached. The light condenser housing part 102 is a region that can house the light condenser 14. The sensor substrate housing part 103 is a region that houses the sensor substrate 15.

The light guide housing parts 101 are regions provided in an upper area of the housing 10, are elongated in the elongated direction of the housing 10, and are open upward. A pressing piece 105 is provided on one side of each light guide housing part 101 in the Y direction (short-hand direction). The pressing piece 105 has an elastic deformable tongue-shaped configuration, and urges the light guide 12 (the light guide 12 to which the light guide cover 13 is attached) housed in the light guide housing part 101, toward the opposite side in the Y direction and toward the lower side in the vertical direction.

The light condenser housing part 102 is a region provided in an upper area of the housing 10, is elongated in the elongated direction of the housing 10, and is open in both the upward and downward directions. The opening provided at the bottom (lower side) of the light condenser housing part 102 communicates with the later-described sensor substrate housing part 103.

As shown in FIG. 1, according to the configuration where the image sensor unit 1 includes a single light condenser 14 and two light guides 12, the housing 10 is provided with a single light condenser housing part 102 and two light guide housing parts 101. In this case, as shown in FIG. 1, the single light condenser housing part 102 is provided between the two light guide housing parts 101. According to the configuration where the image sensor unit 1 includes a single light condenser 14 and two light guides 12, the single light condenser housing part 102 and the single light guide housing part 101 are provided in arrays arranged with respect to each other.

As shown in FIG. 3, the sensor substrate housing part 103 is a region provided in a lower area of the housing 10 (more specifically, the lower areas of the light guide housing parts 101, the light condenser housing part 102 and the light source housing parts 104), and is open downward.

The light source housing parts 104 reside in regions provided on the opposite outer sides of the light guide housing part 101 in the elongated direction in proximity to the opposite ends of the housing 10 in the elongated direction. The light source housing part 104 communicates with the light guide housing part 101 and also with the sensor substrate housing part 103.

Protrusions (called attachment protrusions for the sake of convenience of description) to which rigid members 4 described later are to be attached are provided in proximity to the opposite ends in the elongated direction on two side surfaces 3 (end surfaces in the Y direction) of the housing 10. The attachment protrusion has a protruding configuration that protrudes in the Y direction from the side surface of the housing 10. The attachment protrusion has a thermoplasticity that becomes flexible and deformable by being heated. Only if a configuration is adopted where the housing 10 is made of a thermoplastic material and is formed by injection molding, forming of the attachment protrusions integrally with the housing 10 can form the attachment protrusions having thermoplasticity.

An engagement part where the warping amount adjusting member 411 is engaged (hereinafter called a warping amount adjusting member engagement part) is provided between the two attachment protrusions on each side surface 3 of the housing 10. FIGS. 1 to 3 show the example where the warping amount adjusting member engagement part has a protruding configuration that protrudes from the side of the housing 10. The specific configuration of the warping amount adjusting member engagement part is designed according to the configuration of the rigid member 4 or the like. Accordingly, the configuration is not limited to the configuration shown in FIGS. 1 to 3.

The body cover 17 is a transparent planar member. For example, a glass plate or an acrylic plate is applied as the body cover 17. The configuration of the body cover 17 is not specifically limited only if this cover is made of a material having a high light transmittance and can cover the upper side of the housing 10.

The rigid member 4 and the warping amount adjusting member 411 are members that adjust the warping amount of the housing 10 and hold the warping state of the housing 10. Here, "the warpage of the housing 10" means warpage with the center portion being concave downward when viewed in the Y direction, and warpage with the center portion being convex upward. The center portion is the center portion of the housing 10 in the elongated direction and, for example, a range of ⅓ to ⅔ from the end in the elongated direction.

The rigid member 4 has a higher rigidity than the housing 10 does (resistant to warpage). For example, in the case where the housing 10 is made of the resin material as described above, a configuration of being made of a metal material, such as steel, having a higher rigidity than the resin material does is applicable to the rigid member 4. The rigid member 4 is not limited to the case of steel. It is only required to have a higher rigidity than the housing 10 does (resistant to warpage in the vertical direction). The higher the rigidity, the more preferable. For example, instead of the steel, any of various metal materials, such as aluminum alloys and titanium, is applicable as the rigid member 4.

The rigid member 4 has an elongated shape, such as an elongated rod-like shape or elongated plate shape. Penetration-holes (hereinafter called attachment holes) that allow the respective attachment protrusions of the housing 10 to be inserted are provided in proximity to the opposite ends of each rigid member 4 in the elongated direction. The shape of the rigid member 4 is not specifically limited only if the shape is an elongated shape. For example, the rigid member 4 may have a substantially planar shape as a whole, or have a substantially L-shape (i.e., an angle member) or a substantially U-shape (i.e., a channel member) or the like in section. Note that it is preferable that the shape be resistant to warpage in the vertical direction (high rigidity) as described above. For example, in the case of the planer shape, a shape having a height (the dimension in the vertical direction) larger than the width (the dimension in the sub-scan direction) is applicable.

The warping amount adjusting member 411 is a member having a predetermined dimension in the vertical direction. The specific shape of the warping amount adjusting member 411 is not specifically limited. For example, any of various shapes, such as a sheet-like, planar, rod-like and block-like shape, is applicable as the warping amount adjusting member 411. The material of the warping amount adjusting member 411 is not specifically limited. It is preferable that the warping amount adjusting member 411 be made of a material resistant to compression deformation. For example, any of various metal materials and rigid resin materials (e.g., acrylic and polycarbonate) is applicable as the warping amount adjusting member 411.

<Attachment of Image Sensor Unit>

Next, attachment of the image sensor unit 1 is described.

The light guides 12, to which the light guide covers 13 are attached, are housed in the respective light guide housing parts 101, with these elongated directions being identical to the elongated direction (main-scan direction) of the housing 10. When the light guides 12 to which the light guide covers 13 are attached are housed in the respective light guide housing parts 101, the pressing pieces 105 provided for the housing 10 urge the light guides 12 and the light guide covers 13 in one side in the Y direction (sub-scan direction) and the lower side direction. Thus, the light guide 12 is in a state of being urged and in contact with one inner circumferential surface in the Y direction and the bottom surface of the light guide housing part 101. Consequently, in the case where the light guide 12 is housed in the light guide housing part 101, the light guide 12 is in a state of being positioned in the Y direction (sub-scan direction) and the vertical direction with respect to the housing 10.

The light condenser 14 is housed in the light condenser housing part 102, with the elongated direction (the arrangement direction of the rod lens in the case where the light condenser 14 is the rod lens) being in parallel to the elongated direction of the housing 10 and with the optical axis being in parallel to the vertical direction. The light condenser 14 is caused to adhere and fixed to the housing 10 with ultraviolet curable adhesive, for example. In a state where the image sensor unit 1 is assembled in a paper sheet distinguishing apparatus 5, a reading apparatus 7 or an image forming apparatus 9, the upper focus of the light condenser 14 is set upper than the upper end surface of the housing 10 so as to be positioned on a reading target surface of the reading target object P. The distance from the upper end surface of the housing 10 of the image sensor unit 1 to the upper focus of the light condenser 14 is appropriately set according to the configuration (specifications) of the image sensor unit 1, and the configuration (specifications) of the paper sheet distinguishing apparatus 5, reading apparatus 7 or image forming apparatus 9, to which the image sensor unit 1 is applied. This distance is not specifically limited.

When the sensor substrate 15 is housed in the sensor substrate housing part 103, the image sensor 16 provided on the upper surface of the sensor substrate 15 is positioned on the optical axis of the light condenser 14 housed in the light condenser housing part 102. Each of the photoelectric conversion elements included in the image sensor 16 is positioned on the lower focus of the light condenser 14 housed in the light condenser housing part 102.

The light source 11 is housed in the light source housing part 104. The light source housing part 104 and the light guide housing part 101 are integrally connected to the each other. The light source 11 housed in the light source housing part 104 can emit light toward the light incident surface 121 of the light guide 12 housed in the light guide housing part 101. The light source 11 is electrically connected and physically coupled to the wiring board 152 of the sensor substrate 15 housed in the sensor substrate housing part 103.

The body cover 17 is attached, from the upper side, to the housing 10, which houses the light guides 12, the light condenser 14 and the light sources 11. The body cover 17 is fixed to the upper side of the housing 10 with ultraviolet curable adhesive or double-stick tape, for example. In the case where the body cover 17 is fixed, a state is achieved where the light guide housing part 101, the light condenser housing part 102 and the light source housing part 104 are covered from the upper side. This configuration prevents foreign matters, such as dust, from intruding into the housing 10.

The rigid members 4 are disposed on the respective side surfaces 3 of the housing 10, and are attached via the attachment protrusions. In the embodiment of the present invention, the attachment protrusions of the housing 10 are inserted into the attachment holes provided for the rigid members 4, and the distal ends of the attachment protrusions (parts protruding from the attachment holes of the rigid members 4) are caulked (thermally deformed in a manner of being overlapped around the attachment holes). As described above, each rigid member 4 is fixed to the housing 10 via the two attachment protrusions provided at the opposite ends in the elongated direction (main-scan direction). Note that the rigid members 4 is not fixed to the housing 10 between the two attachment protrusions. Accordingly, the housing 10 can be moved (deformed in the vertical direction) relatively with respect to the rigid member 4 between the two fixation positions. That is, the housing 10 can be warped so that the center portion in the elongated direction (main-scan direction) can be convex upward when viewed in the Y direction (when viewed in the sub-scan direction), and can be warped so that the center portion in the elongated direction can be concave downward.

Preferably, a configuration is adopted where the rigid members 4 are disposed and attached to both of the two side surfaces 3 of the housing 10. In this case, the attachment protrusions at two sites are provided for each of the two side surfaces 3. Preferably, to allow the housing 10 to be warped and deformed, the positions of the two attachment protrusions in the elongated direction are the same on the two side surfaces 3 (when viewed in the Y direction, the attachment protrusions on one side surface 3 and the attachment protrusions on the other side surface 3 coincide with each other). The fixing structure of the rigid members 4 are described later.

In this connection, preferably, in a state where the image sensor unit 1 is assembled in the later-described paper sheet distinguishing apparatus 5, reading apparatus 7 or image forming apparatus 9, the distance between the housing 10 and the reading target object P (the distance between the body cover 17 and the reading target object P in a case where the body cover 17 is provided) is held to be a predetermined distance. In this case, in the state where the image sensor unit 1 is assembled in the later-described paper sheet distinguishing apparatus 5, reading apparatus 7 or image forming apparatus 9, the housing 10 of the image sensor unit 1 may sometimes be held in a warping state. For example, in view of securing the smooth and relative movement between the image sensor unit 1 and the reading target object P, the housing 10 of the image sensor unit 1 may sometimes be in a state where the intermediate part in the elongated direction is concave downward.

The warping amount may be different according to the configuration of the paper sheet distinguishing apparatus 5, reading apparatus 7 or image forming apparatus 9, in which the image sensor unit 1 is assembled. The warping amount of the housing 10 varies with age according to the temporal deterioration of each of the members constituting the image sensor unit 1. For example, according to the configuration where the body cover 17 is caused to adhere and fixed to the housing 10 with ultraviolet curable adhesive, the adhesive is subjected to deterioration with age and the dimensions are changed. As a result, the warping amount of the housing 10 is temporarily changed in some cases. Accordingly, the housing 10 has a warping amount different from the desired amount in some cases.

Accordingly, in the embodiment of the present invention, the warping amount adjusting member intervenes between the rigid member 4 and the warping amount adjusting member engagement part, thereby holding the housing 10 in the warping state. That is, the warping amount adjusting member engagement parts provided for the housing 10 and the rigid members (in particular, the parts of the rigid members that overlap the warping amount adjusting member engagement parts when viewed in the vertical direction) form the warping amount adjusting parts that adjust the warping amount of the housing 10. In such a configuration, the warping amount of the housing 10 is defined in conformity with the vertical-direction dimensions of the warping amount adjusting members. For example, multiple types of warping amount adjusting members having vertical-direction dimensions different from each other are preliminarily prepared, and the warping amount adjusting members which are to intervene between the rigid members 4 and the warping amount adjusting member engagement parts are appropriately selected, thereby allowing the housing 10 to have a desired warping amount.

<Attachment Structure of Rigid Members>

Next, the attachment structure of the rigid members 4 to the housing 10 is described with reference to FIGS. 4A to 8B. FIGS. 4A to 8B are diagrams illustrating the attachment structure of the rigid members 4 to the housing 10. Attachment protrusions 36 protruding in the Y direction (sub-scan direction) are provided at or in proximity to the opposite ends of the side surfaces 3 of the housing 10. Attachment holes 42 penetrating in the Y direction are provided at or in proximity to the opposite ends of the rigid members 4 in the elongated direction (main-scan direction). The opposite ends described here are the opposite ends of the housings 10 in the elongated direction, and are, for example, a range of ⅓ of the elongated direction dimension from the end in the elongated direction. Each attachment protrusion 36 provided for the housing 10 is inserted into the attachment hole 42 provided for the rigid member 4. A distal end (a portion protruding from the attachment hole 42 of the rigid members 4) of the attachment protrusion 36 is provided with a flange-shaped portion of the attachment protrusion 36 that has an external dimension larger than that at other portions when viewed in the protruding direction (when viewed in the Y direction). For the sake of convenience of description, the flange-shaped portion is called "flange portion 361". When viewed in the protruding direction of the attachment protrusion 36, the external line (outline) of the flange portion 361 is disposed outer than the inner circumferential surface of the attachment hole 42 provided for the rigid member 4. Accordingly, at least a part of the flange portion 361 overlaps a surface of the rigid member 4 that is opposite to the surface facing the side surface 3 of the housing 10. According to such an attachment structure, the flange portion 361 provided at the distal end of the attachment protrusion 36 is in a state of being engaged with the rigid members 4, and the rigid member 4 is held in a state of being attached onto the side surface 3 of the housing 10. For the sake of convenience of description, the "surface of the rigid member 4 that is opposite to the surface facing the side surface 3 of the housing 10" is called "non-facing surface 401".

A method of forming such an attachment structure may be an applicable method of pressing the distal end of the attachment protrusion 36 while heating and softening this end to plastically deform the distal end of the attachment protrusion 36 to be expanded to thereby form the flange portion 361. For the sake of convenience of description, such a method is called "caulking".

According to such an attachment structure, for the sake of the attachment operation, it is preferable that the external dimension of the attachment protrusion 36 of the housing 10 when viewed in the Y direction be smaller than the inner diameter (inner dimension) of the attachment hole 42 of the rigid members 4. However, according to such a dimension relationship, in the state where the rigid member 4 is attached onto the side surface 3 of the housing 10, a gap sometimes occurs between the external circumferential surface of the attachment protrusion 36 and the inner circumferential surface of the attachment hole 42. If the gap occurs, there is a possibility that the rigid members 4 is relatively movable with respect to the housing 10 (occurrence of a backlash). There is a possibility that the warping amount is changed and a desired warping amount cannot be held if the warping amount of the housing 10 is adjusted by the warping amount adjusting member 411 and subsequently the rigid members 4 is relatively moved with respect to the housing 10. Accordingly, it is preferable that the rigid members 4 attached onto the side surface 3 of the housing 10 be not relatively movable with respect to the housing 10 at least in the vertical direction. In present invention, the rigid members 4 is attached so as to be not relatively movable with respect to the housing 10 at least in the vertical direction.

(First Example of Attachment Structure of Rigid Members)

FIGS. 4A and 4B are diagrams showing the attachment structure of the rigid members 4 to the housing 10 according to a first example. FIG. 4A is a partial perspective view of the rigid member 4. FIG. 4B is a sectional view of the attachment structure. As shown in FIGS. 4A and 4B, a step portion 43 is provided, as an example of the concave, on the non-facing surface 401 of the rigid member 4 (the surface opposite to the surface facing the side surface 3 of the housing 10). As shown in FIG. 4B, at least a part of the flange portion 361 of the attachment protrusion 36 is inserted into the step portion 43, and the inner circumferential surface of the step portion 43 and the flange portion 361 are in contact with each other without any gap. According to such a configuration, even if a gap is present between a part (e.g., a base part) of the attachment protrusion 36 other than the flange portion 361 and the inner circumferential surface of the attachment hole 42, the rigid member 4 cannot be relatively moved with respect to the housing 10. Consequently, the variation in the warping amount of the housing 10 can be prevented or suppressed, and the adjusted warping amount can be held (reduction in warping amount can be facilitated.).

FIGS. 4A and 4B show an example of a configuration where the step portion 43 is formed to have an annular shape encircling the attachment hole 42. Such formation of the step portion 43 having the annular shape encircling the attachment hole 42 as described above facilitates entrance of the distal end of the attachment protrusion 36 softened during caulking into the entire region of the step portion 43. Accordingly, the rigid members 4 cannot relatively move in any direction with respect to the housing 10. The shape of the step portion 43 is not limited to an annular shape encircling the attachment hole 42. The dimensions are not limited either. In short, the step portion 43 (the concave provided for the non-facing surface 401) is only required to have dimensions and a shape where the flange portion 361 inserted into the step portion 43 is in contact with the inner circumferential surface of the step portion 43 when the attachment protrusion 36 is caulked to form the flange portion 361. In the state where the flange portion 361 inserted into the step portion 43 is in contact with the inner circumferential surface of the step portion 43, the movement of the rigid members 4 is prevented or suppressed.

(Second Example of Attachment Structure of Rigid Members)

Figure 5A:
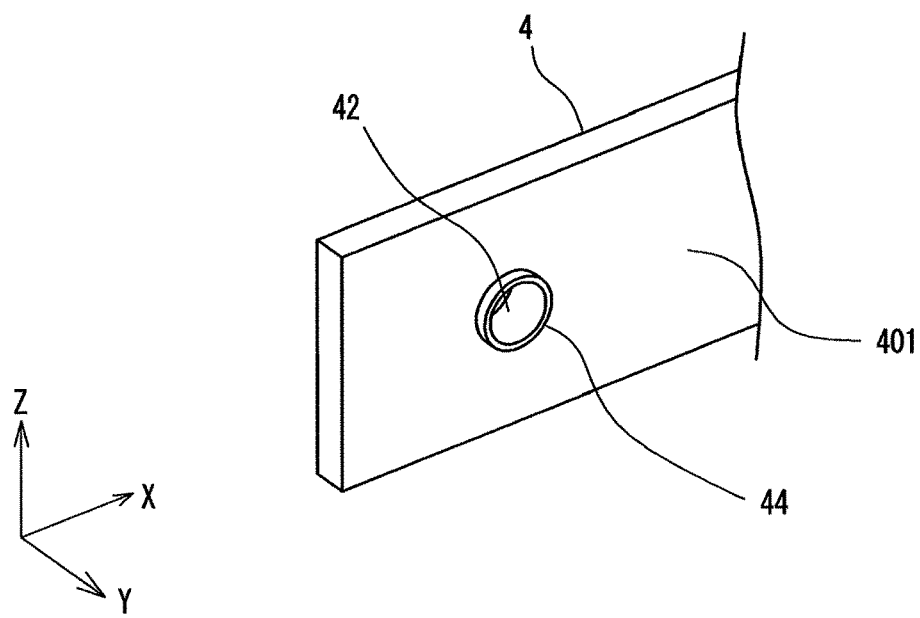
FIG. 5A is a diagram illustrating the attachment structure of a rigid member according to a second example.
Figure 5B:
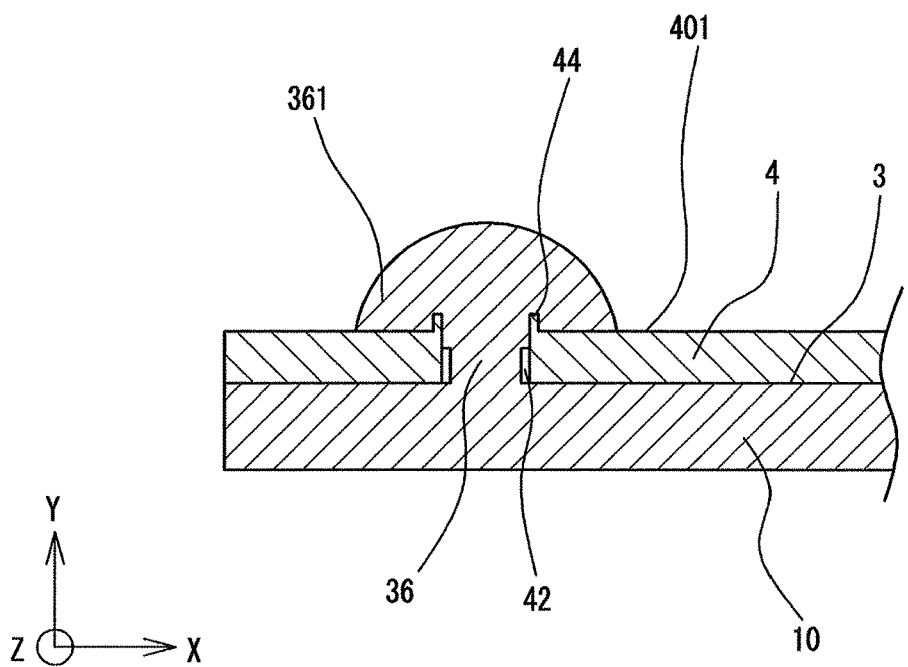
FIG. 5B is a diagram illustrating the attachment structure of the rigid member according to the second example.

FIGS. 5A and 5B are diagrams showing the attachment structure of the rigid members 4 to the housing 10 according to a second example. FIG. 5A is a partial perspective view of the rigid member 4. FIG. 5B is a sectional view of the attachment structure. In the second example, a protrusion (hereinafter, called a fitting protrusion 44) protruding from the non-facing surface 401 is provided around the attachment hole 42. FIGS. 5A and 5B show a configuration where the annular fitting protrusion 44 is provided over the entire attachment hole 42, as an example. A method of forming such a fitting protrusion 44 may be an applicable method of burring, for example. The fitting protrusion 44 does not necessarily have the configuration of being provided over the entire periphery of the attachment hole 42. A partially provided configuration may be adopted instead. Alternatively, a configuration where multiple fitting protrusions 44 are provided around the attachment hole 42 may be adopted.

According to such a configuration, after the attachment protrusion 36 of the housing 10 is caulked, the flange portion 361 formed by caulking is in a state of covering the fitting protrusion 44. In other words, a state is achieved where the fitting protrusion 44 is inserted into the flange portion 361. The fitting protrusion 44 and the flange portion 361 are in a state of being in direct contact with each other. Accordingly, the rigid members 4 cannot relatively move with respect to the housing 10. The dimensions, shape and position of the fitting protrusion 44 are not specifically limited. However, it is preferable that the dimensions, shape and position be those allowing the flange portion 361 formed by caulking to be in direct contact without any gap. Specific dimensions, shape and position may be appropriately defined in conformity with the dimensions and shape of the attachment protrusion 36 provided for the housing 10. Such a configuration can also exert advantageous effects analogous to those in the first example.

(Third Example of Attachment Structure of Rigid Members)

Figure 6A:
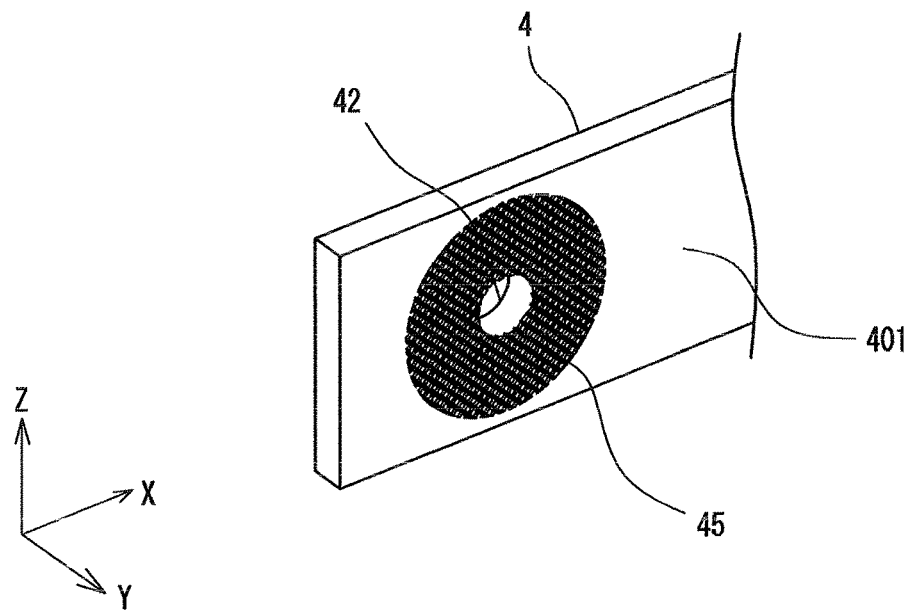
FIG. 6A is a diagram illustrating the attachment structure of a rigid member according to a third example.
Figure 6B:
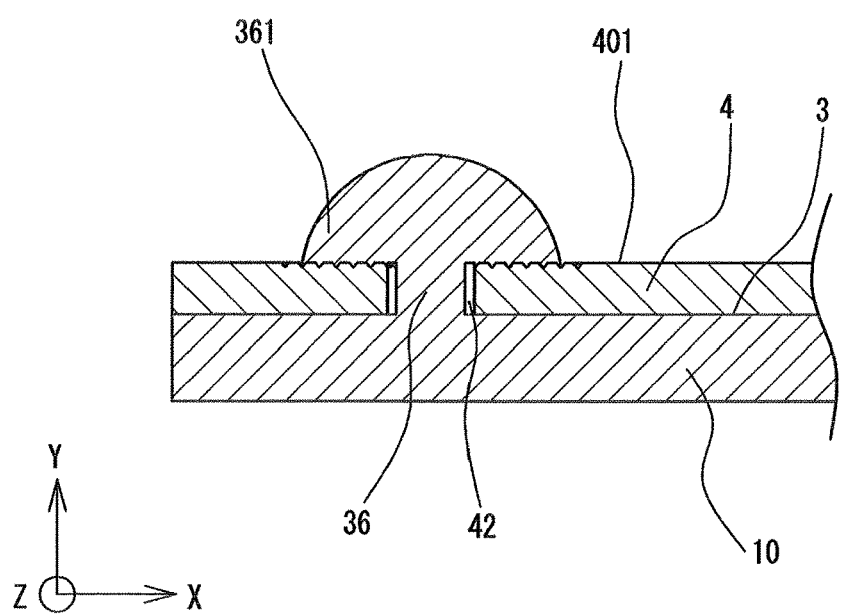
FIG. 6B is a diagram illustrating the attachment structure of the rigid member according to the second example.

FIGS. 6A and 6B are diagrams showing the attachment structure of the rigid members 4 to the housing 10 according to a third example. FIG. 6A is a partial perspective view of the rigid member 4. FIG. 6B is a sectional view of the attachment structure. As shown in FIGS. 6A and 6B, in the third example, grooves 45 are provided, as an example of the concave, around the attachment hole 42 of each rigid member 4. After the attachment protrusion 36 is caulked to form the flange portion 361, a state is achieved where a part of the flange portion 361 is inserted into the grooves 45. Accordingly, the rigid members 4 cannot relatively move with respect to the housing 10 in directions intersecting with the extending directions of the grooves 45. Consequently, advantageous effects analogous to those in the first example and the second example can be exerted.

FIGS. 6A and 6B show, as an example, the configuration where multiple linear grooves 45 extending in directions different from each other are provided. As described above, according to the configuration where the multiple grooves 45 extending in the directions different from each other are provided, the rigid members 4 cannot be relatively moved in any direction with respect to the housing 10. Note that the grooves 45 do not necessarily have linear shapes. For example, a configuration may be adopted where circular grooves 45 are provided so as to encircle the attachment hole 42. In this case, a configuration may be adopted where multiple annular grooves 45 are provided concentrically so as to encircle the attachment hole 42. The position and range where the grooves 45 are provided are not necessarily limited. The grooves 45 may be any configuration of being provided at positions and range that are contactable with the flange portion 361. Accordingly, the position and range where the grooves 45 are provided are configured in conformity with the dimensions and shape of the attachment protrusion 36. The sectional dimensions and sectional shapes of the grooves 45 are not specifically limited. According to the configuration where the multiple grooves 45 are provided, the gaps between the grooves 45 are not specifically limited.

(Fourth Example of Attachment Structure of Rigid Members)

Preferably, each rigid member 4 has a configuration immobile relatively with the housing 10 at least in the vertical direction. Meanwhile, the configuration may allow relative movement in the elongated direction (main-scan direction) of the rigid members 4 and the housing 10. For example, if the rigid members 4 and the housing 10 have different coefficients of thermal expansion, the amount of variation in dimensions due to variation in temperature is different. Accordingly, if the rigid members 4 and the housing 10 cannot relatively move in the elongated direction, there is a possibility that the warping amount of the housing 10 varies owing to variation in temperature. For example, if the coefficient of thermal expansion of the housing 10 is larger than the coefficient of thermal expansion of each rigid member 4, increase in temperature possibly increases the warping amount. Accordingly, to prevent or suppress variation in warping amount due to difference in coefficient of thermal expansion (to facilitate reduction in warping amount), a configuration may be adopted where the relative movement between the rigid members 4 and the housing 10 is allowed in the elongated direction.

Figure 7A:
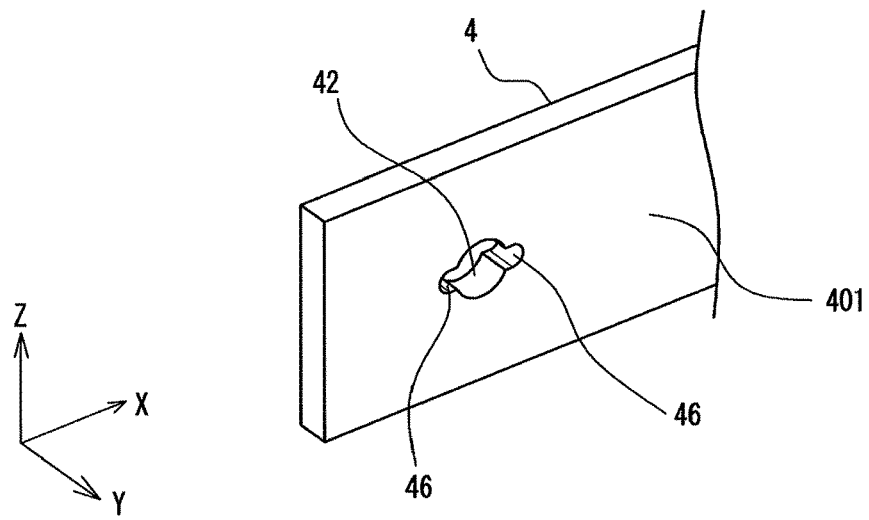
FIG. 7A is a diagram illustrating the attachment structure of a rigid member according to a fourth example.
Figure 7B:
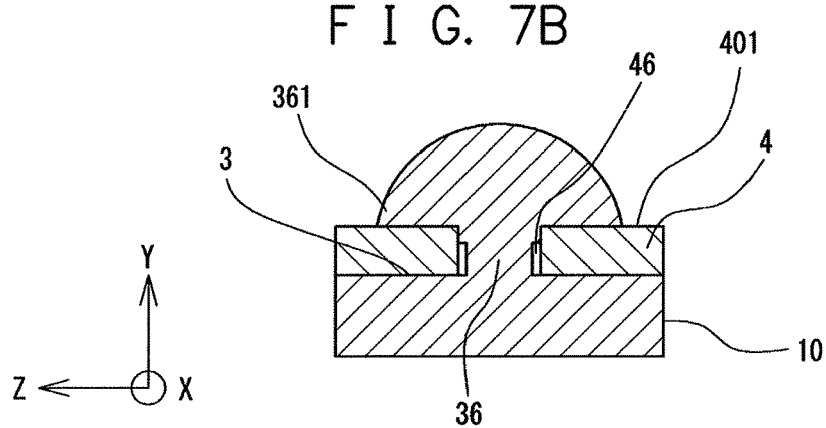
FIG. 7B is a diagram illustrating the attachment structure of the rigid member according to the fourth second example.
Figure 7C:
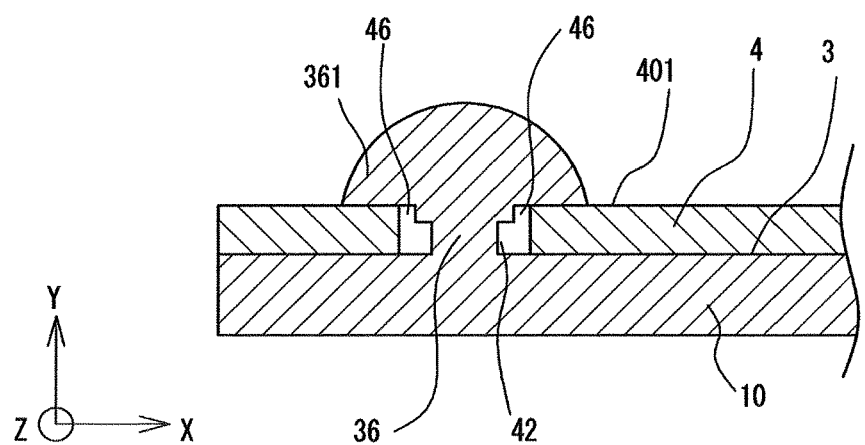
FIG. 7C is a diagram illustrating the attachment structure of the rigid member according to the fourth second example.

The attachment structure according to the fourth example is a configuration example allowing relative movement between the rigid members 4 and the housing 10 in the elongated direction. FIGS. 7A, 7B and 7C are diagrams showing an attachment structure of the rigid members 4 to the housing 10 according to the fourth example. FIG. 7A is a partial perspective view of the rigid member 4. FIG. 7B is a sectional view of the attachment structure taken along a plane perpendicular to the elongated direction. FIG. 7C is a sectional view of the attachment structure taken along a plane perpendicular to the vertical direction. As shown in FIGS. 7A to 7C, each rigid member 4 is provided with sub-holes 46 communicating integrally with the attachment hole 42, as an example of the concave. A long hole shape extending in the elongated direction of the housing 10 when viewed in the Y direction is applicable to each sub-hole 46. The sub-holes 46 are respectively provided at the opposite ends (the opposite ends of the housing 10 in the elongated direction) of the attachment hole 42.

Parts of the flange portion 361 formed by caulking the distal end of the attachment protrusion 36 are inserted into the respective parts of the sub-holes 46. In the state where the rigid members 4 are attached to the housing 10, the upper surface and the lower surface of the flange portion 361 are in contact with the upper surfaces and the lower surfaces in the inner circumferential surfaces of the sub-holes 46. Note that the end surfaces of the flange portion 361 in the elongated direction are not in contact with the end surfaces in the inner circumferential surfaces of the sub-holes 46 in the elongated direction, and gaps are formed therebetween. According to such a configuration, the rigid members 4 cannot move in the vertical direction with respect to the housing 10, but can relatively move in the elongated direction (relative movement is allowed). Consequently, even if the rigid members 4 and the housing 10 have different coefficient of thermal expansions, the variation in the warping amount of the housing 10 due to variation in temperature can be prevented or suppressed (the warping amount can be reduced), and the adjusted warping amount can be held.

The number, dimensions and shape of the sub-holes 46 are not specifically limited. Each sub-hole 46 does not necessarily penetrate in the Y direction, and may be a concave having a bottom, such as the step portion 43 in the first example.

(Five Example of Attachment Structure of Rigid Members)

Figure 8A:
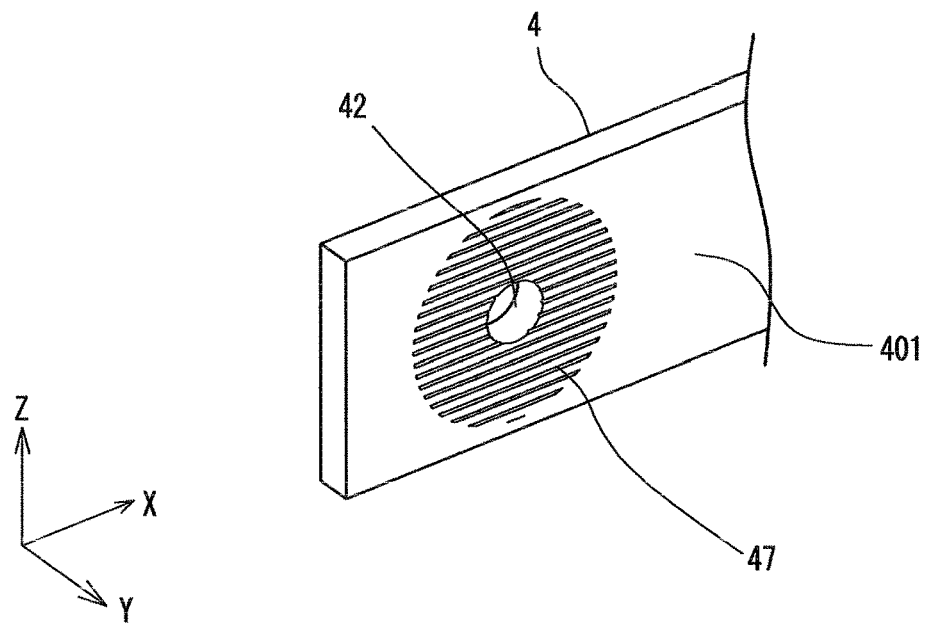
FIG. 8A is a diagram illustrating the attachment structure of a rigid member according to a fifth example.
Figure 8B:
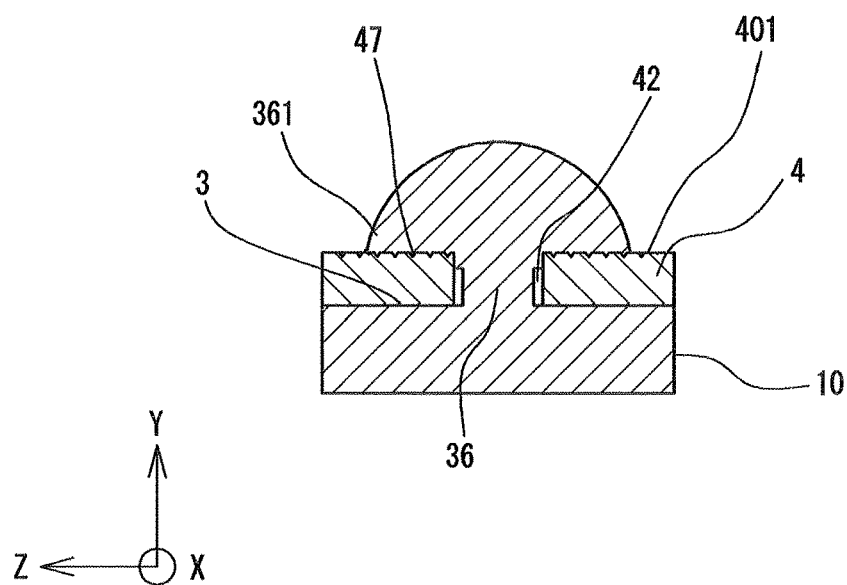
FIG. 8B is a diagram illustrating the attachment structure of the rigid member according to the fifth example.

As with the fourth example, a fifth example is also an example where the rigid members 4 and the housing 10 cannot relatively move in the vertical direction, but are allowed to move relatively in the elongated direction. FIGS. 8A and 8B are diagrams showing the attachment structure of the rigid members 4 to the housing 10 according to the fifth example. FIG. 8A is a partial perspective view of the rigid member 4. FIG. 8B is a sectional view of the attachment structure. As shown in FIGS. 8A and 8B, grooves 47 extending in the elongated direction are provided on the non-facing surface 401 around the attachment hole 42 of each rigid member 4.

After the attachment protrusion 36 of the housing 10 is caulked to form the flange portion 361, a part of the flange portion 361 is inserted into the grooves 47. At least parts of the external circumferential surface of the flange portion 361 is directly contact with the inner circumferential surfaces of the grooves 47. It is only required that at least parts of the portions inserted into the grooves 47 are in direct contact with the inner circumferential surfaces of the grooves 47. There may be parts that are not in direct contact. Such a configuration allows the rigid members 4 to move relatively with respect to the housing 10 in the extending directions of the grooves 47. Meanwhile, in directions intersecting with the extending directions of the grooves 47 (for example, directions orthogonal to the extending directions of the grooves 47), the rigid members 4 cannot relatively move with respect to the housing 10. If the extending directions of the grooves 47 are the same direction as (in parallel to) the elongated direction of the housing 10, the rigid members 4 can relatively move with respect to the housing 10 in the elongated direction of the housing 10, but cannot relatively move with respect to the housing 10 in the vertical direction. Consequently, such a configuration can also exert advantageous effects analogous to those in the fourth example.

The position and range where the grooves 47 are formed are not specifically limited. Any position and range that allow the flange portion 361 around the attachment hole 42 to be in contact may be adopted. The sectional shape and dimensions of the grooves 47 are not specifically limited. The number of grooves 47 is not specifically limited either. The example where the grooves 47 are formed has herein been shown. Alternatively, a configuration where convex threads extending in the elongated direction are formed may be adopted. Further alternatively, a configuration where the grooves 47 extending in the elongated direction and convex threads are alternately formed may be adopted.

As described above, according to the embodiment of the present invention, at least the relative movements between the rigid members 4 and the housing 10 in the vertical direction can be prevented or suppressed. Consequently, the variation in warping amount caused by the relative movements between the rigid members 4 and the housing 10 can be prevented or suppressed. Any configuration that allows the relative movements of the rigid members 4 and the housing 10 in the elongated direction can prevent or suppress variation in the warping amount caused by the difference in the amount of thermal deformation even if the rigid members 4 and the housing 10 have different coefficient of thermal expansions.

The attachment structures of the rigid members 4 to be applied may be the same as or different from each other between one end and the other end of the image sensor unit 1 in the elongated direction. For example, the first example may be applied to both the attachment structures of each rigid member 4 at the opposite ends in the elongated direction. Alternatively, a configuration may be adopted where the first example is applied to one end while the second example is applied to the other end.

<Configuration Example of Warping Amount Adjusting Part>

Next a configuration example of the warping amount adjusting part is described.

(First Example of Warping Amount Adjusting Part)

Figure 9:
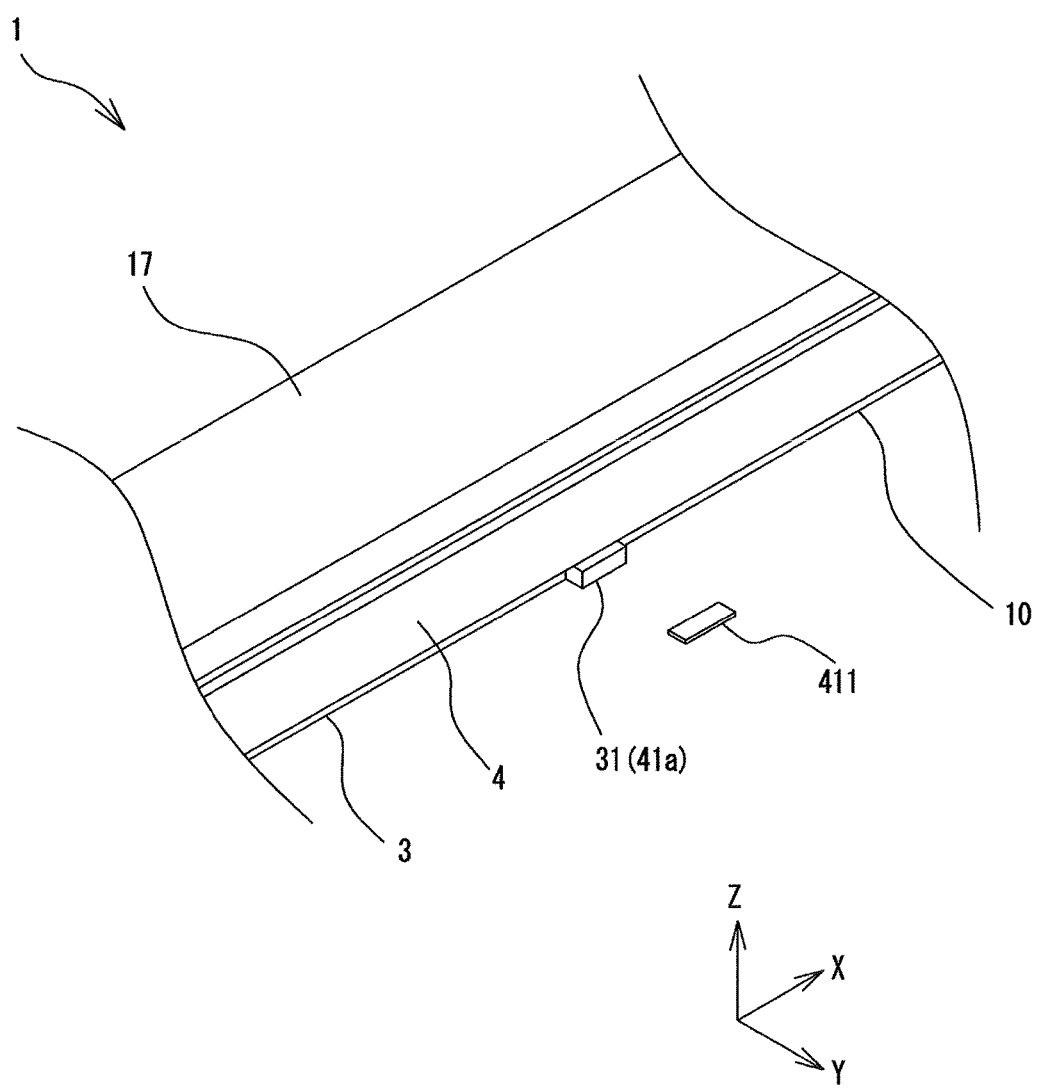
FIG. 9 is a perspective view schematically showing a configuration of a warping amount adjusting part according to a first example.
Figure 10A:
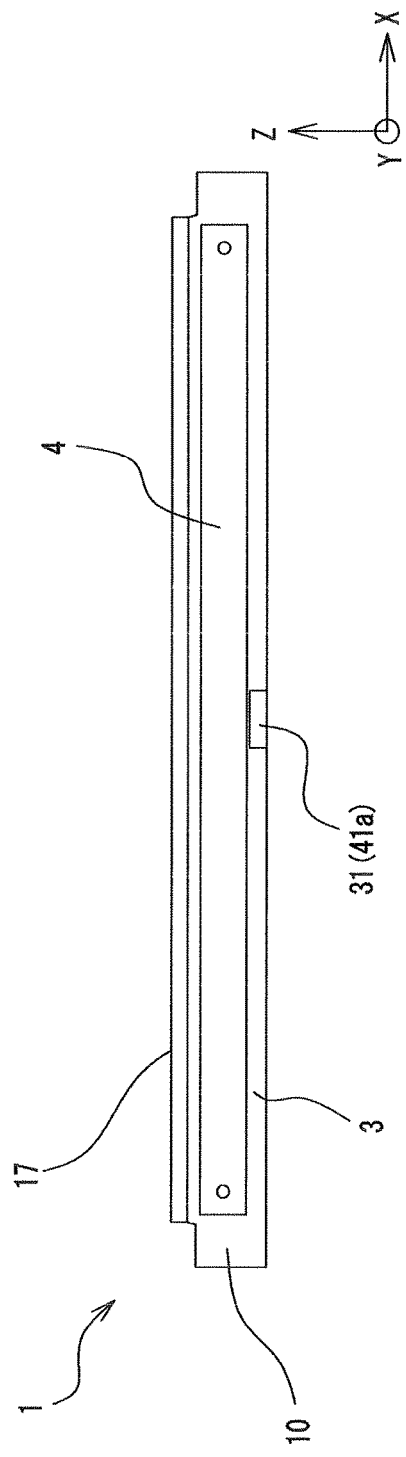
FIG. 10A is a side view schematically showing adjustment of the warping amount of the housing by a warping amount adjusting part when viewed in the Y direction.
Figure 10B:
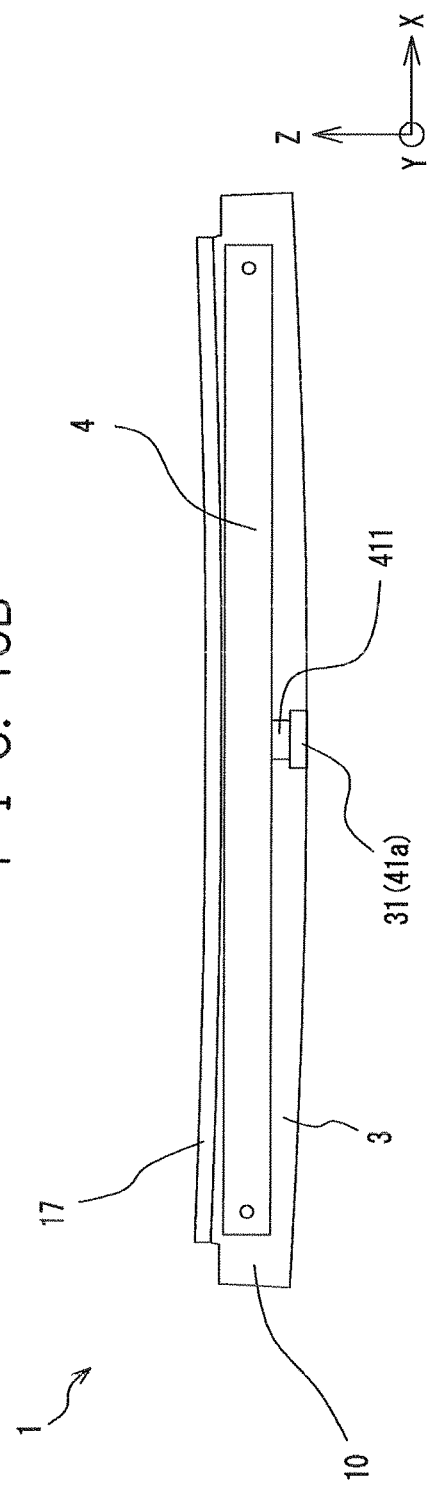
FIG. 10B is a side view schematically showing adjustment of the warping amount of the housing by the warping amount adjusting part when viewed in the Y direction.

First, the warping amount adjusting part 41a according to a first example is described with reference to FIGS. 9, 10A and 10B. FIG. 9 is a perspective view schematically showing the configuration of the warping amount adjusting part 41a according to the first example, and is an enlarged diagram of V part of FIG. 2. FIGS. 10A and 10B are side views schematically showing adjustment of the warping amount of the housing 10 by the warping amount adjusting part 41a when viewed in the sub-scan direction. FIG. 10A shows a state before use of the warping amount adjusting member 411. FIG. 10B shows a state with the warping amount adjusting member 411 being included. FIGS. 10A and 10B show the dimensions and shapes of the members in different manners from the actual ones so as to enhance the warpage of the housing 10.

On the side surface 3 of the housing 10, a warping amount adjusting convex 31 is provided between the two fixation positions at which the rigid member 4 is fixed. The warping amount adjusting convex 31 is a convex that protrudes to the outside in the sub-scan direction. The warping amount adjusting convex 31 may have a configuration integrally provided for the housing 10, or a configuration where another member is fixed. The warping amount adjusting convex 31 is provided so as to be positioned below the rigid member 4 when viewed in the sub-scan direction, and is provided so that at least a part can overlap the rigid member 4 when viewed in the vertical direction (when viewed in the direction of the optical axis of the light condenser 14). The warping amount adjusting convex 31 provided for the housing 10, and the part overlapping the warping amount adjusting convex 31 of the rigid member 4 when viewed in the vertical direction (when viewed in the direction of the optical axis of the light condenser 14) form the warping amount adjusting part 41a according to the first embodiment.

That is, as shown in FIG. 10B, the warping amount adjusting member 411 is provided so as to intervene between the warping amount adjusting convex 31 and the rigid member 4, thereby allowing the housing 10 to be warped so that the center in the elongated direction can become concave downward. More specifically, between the warping amount adjusting convex 31 of the housing 10 and the lower side (lower surface) of the rigid member 4, the warping amount adjusting member 411 having a larger dimension in the vertical direction than the gap therebetween is caused to intervene. The intervention achieves the state where the gap between the housing 10 and the rigid member 4 are widened by the warping amount adjusting member 411. The housing 10 has a smaller rigidity than the rigid member 4 does. Consequently, in a case where the state is achieved where the gap is widened by the warping amount adjusting member 411, the center of the housing 10 becomes to be in the state where the center of the housing 10 is warped concave downward.

Such intervention of the warping amount adjusting member 411 between the warping amount adjusting convex 31 and the lower side (lower surface) of the rigid member 4 can hold the housing 10 in the state where its center in the elongated direction is warped concave downward. The warping amount is determined according to the dimension of the warping amount adjusting member 411 in the vertical direction. Consequently, the intervening warping amount adjusting member 411 in the vertical direction is changed, or the number of intervening warping amount adjusting members 411 is changed; such change can adjust the warping amount of the housing 10. It can be easily verified whether the warping amount of the housing 10 is adjusted by the warping amount adjusting member 411 or not, by taking out the warping amount adjusting member 411 from between the warping amount adjusting convex 31 and the lower side of the rigid member 4. That is, if the image sensor unit 1 is left in a state where the warping amount adjusting member 411 is taken out, the shape of the housing 10 returns to the shape before adjustment in a case where the warping amount has been adjusted by the warping amount adjusting member 411. Consequently, observation of the variation in shape of the housing 10 can verify whether the warping amount of the housing 10 is adjusted by the warping amount adjusting member 411 or not.

To achieve the shape of the housing 10 in the warping state being symmetrical with respect to the center in the main-scan direction, it is preferable that the fixation parts at the two positions be provided at the positions symmetrical with respect to the center of the housing 10 in the elongated direction, and the warping amount adjusting convex 31 be positioned at the center of the housing 10 in the elongated direction. The positions of the two fixation parts and the warping amount adjusting convex 31 are not specifically limited. These positions are appropriately set according to the desired shape of the housing 10. In short, any configuration may be adopted only if the rigid members 4 are fixed to the housing 10 at at least two positions apart from each other in the elongated direction, and the warping amount adjusting convex 31 is positioned at the position between the two fixation positions in the elongated direction.

FIGS. 9, 10A and 10B show the configuration where the warping amount adjusting convex 31 is positioned below the rigid member 4. However, the configuration is not limited to such a configuration. The warping amount adjusting convex 31 may have a configuration of being provided above the rigid member 4. In a case where the warping amount adjusting convex 31 is provided above the rigid member 4, the intervention of the warping amount adjusting member 411 between the warping amount adjusting convex 31 and the rigid member 4 can warp the housing 10 so that the center in the elongated direction can be concave upward, and adjust the warping amount. Alternatively, a configuration may be adopted where the warping amount adjusting convexes 31 are provided above and below the rigid member 4. In this case, the housing 10 can be warped so that the center in the elongated direction can protrude upward, and can be warped so that the center in the elongated direction can be concave downward. In both the cases, the warping amount is adjustable.

Furthermore, FIGS. 9, 10A and 10B show the configuration where the single warping amount adjusting convex 31 (i.e., the warping amount adjusting part 41a at the single position) is provided on the one side surface 3 of the housing 10. However, the number of warping amount adjusting convexes 31 (the number of warping amount adjusting parts 41a) is not specifically limited. For example, a configuration may be adopted where the multiple warping amount adjusting convexes 31 are provided on the side surfaces 3 of the housing 10. In this case, the intervention of the warping amount adjusting member 411 between the warping amount adjusting convex 31 and the rigid member 4 can accurately adjust the warping amount of the housing 10.

(Second Example of Warping Amount Adjusting Part)

Figure 12A:
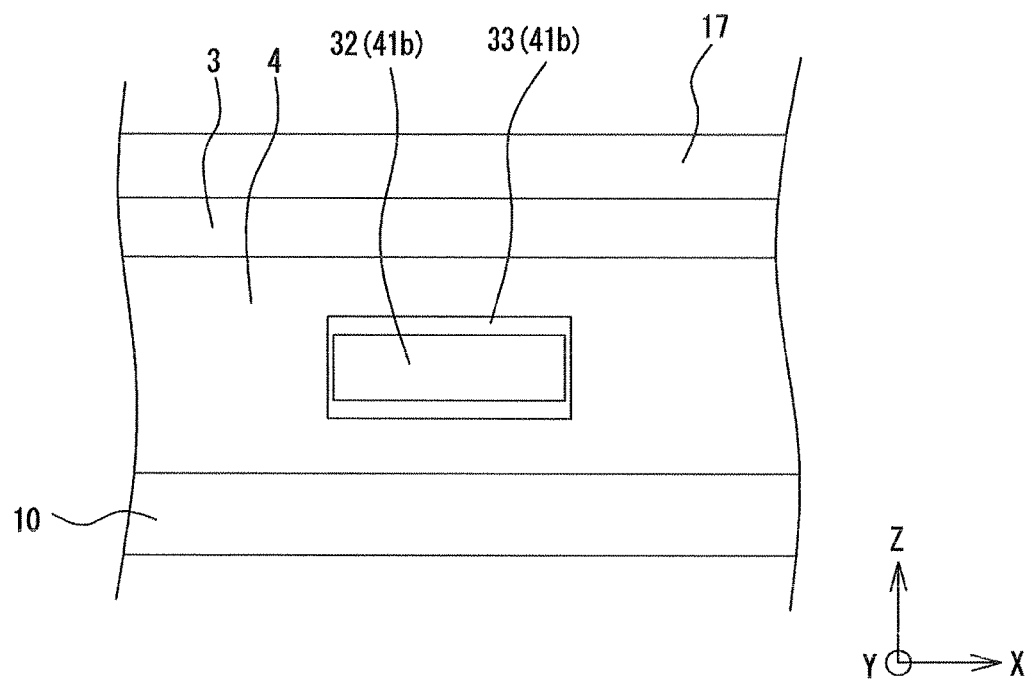
FIG. 12A is a side view schematically showing adjustment of the warping amount of the housing by the warping amount adjusting part when viewed in the Y direction.
Figure 12B:
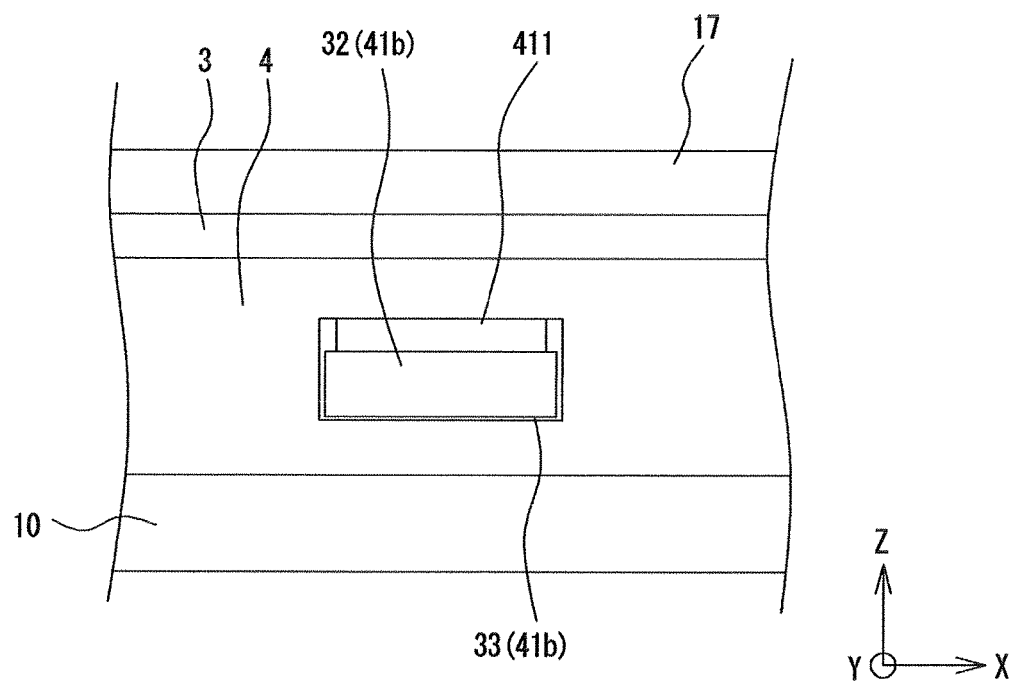
FIG. 12B is a side view schematically showing adjustment of the warping amount of the housing by the warping amount adjusting part when viewed in the Y direction.

Next, the warping amount adjusting part 41b according to a second example is described with reference to FIGS. 11, 12A and 12B. Note that the same numerals are given to configuration elements common to the first example and repeated description will be omitted. FIG. 11 is a perspective view schematically showing the configuration of the warping amount adjusting part 41b according to the second example, and corresponds to an enlarged diagram of V part of FIG. 2. FIGS. 12A and 12B are side views schematically showing adjustment of the warping amount of the housing 10 by the warping amount adjusting part 41b when viewed in the sub-scan direction. FIG. 12A shows a state before use of the warping amount adjusting member 411. FIG. 12B shows a state with the warping amount adjusting member 411 being included.

As shown in FIGS. 11, 12A and 12B, a warping amount adjusting opening 33 is provided at an intermediate part of the rigid member 4 in the elongated direction. The warping amount adjusting opening 33 is a penetration-hole shaped opening that penetrates through in the sub-scan direction. On the side surface 3 of the housing 10, a warping amount adjusting convex 32 is provided between the two fixation positions at which the rigid member 4 is fixed. The warping amount adjusting convex 32 is a convex protruding to the outside in the sub-scan direction. A configuration element common to the warping amount adjusting convex 31 according to the first example is applicable. Note that, in the second example, the warping amount adjusting convex 32 is fit into the warping amount adjusting opening 33 provided for the rigid member 4. Accordingly, when viewed in the vertical direction (when viewed in the direction of the optical axis of the light condenser 14), at least a part of the warping amount adjusting convex 32 overlaps the inner circumferential surface of the warping amount adjusting opening 33. As described above, the warping amount adjusting convex 32 provided for the housing 10, and the inner circumferential surface of the warping amount adjusting opening 33 provided for the rigid member 4 form the warping amount adjusting part 41b according to the second example.

As shown in FIG. 12B, the intervention of the warping amount adjusting member 411 between the warping amount adjusting convex 32 of the housing 10 and the inner circumferential surface of the warping amount adjusting opening 33 of the rigid member 4 can warp the housing 10 so that the intermediate part in the elongated direction can be convex upward or can be concave downward. As described above, the intervention of the warping amount adjusting member 411 between the warping amount adjusting convex 32 of the housing 10 and the inner circumferential surface (in particular, the upper surface or lower surface) of the warping amount adjusting opening 33 of the rigid member 4 can hold the housing 10 in the warping state. As with the first example, the warping amount is determined according to the dimension of the warping amount adjusting member 411 in the vertical direction. Consequently, the dimension of the intervening warping amount adjusting member 411 in the vertical direction is changed, or the number of intervening warping amount adjusting members 411 is changed; such change can adjust the warping amount of the housing 10.

The positions at which the warping amount adjusting convex 32 of the housing 10 and the warping amount adjusting opening 33 of the rigid member 4 are provided (i.e., the positions at which the warping amount adjusting part 41b according to the second example are provided) may be the same as the positions of the first example. As with the first example, multiple warping amount adjusting parts 41b according to the second embodiment may be provided.

(Third Example of Warping Amount Adjusting Part)

Next, a warping amount adjusting part 41c according to a third example is described with reference to FIGS. 13A and 13B. Note that the same numerals are given to configuration elements common to the first example and repeated description will be omitted. FIGS. 13A and 13B are sectional views schematically showing the configuration of the warping amount adjusting part 41c according to the third example. FIG. 13A shows a state before use of the warping amount adjusting member 411. FIG. 13B shows a state with the warping amount adjusting member 411 being included.

On the side surface 3 of the housing 10, a warping amount adjusting concave 35 is provided between the two fixation positions at which the rigid member 4 is fixed. A concave toward the inside in the sub-scan direction is applicable as the warping amount adjusting concave 35. On the other hand, the intermediate part of the rigid member 4 in the elongated direction is provided with warping amount adjusting convexes 34 that protrude in the sub-scan direction toward the side surface 3 of the housing 10. The warping amount adjusting convexes 34 provided for the rigid member 4 are fit into the warping amount adjusting concave 35 provided on the side surface 3 of the housing 10. Accordingly, when viewed in the vertical direction (when viewed in the direction of the optical axis of the light condenser 14), at least parts of the warping amount adjusting convexes 34 for the rigid member 4 overlaps the inner circumferential surfaces of the warping amount adjusting concave 35 for the housing 10. As described above, the warping amount adjusting convexes 34 provided for the rigid member 4, and the inner circumferential surfaces of the warping amount adjusting concave 35 provided for the housing 10 form the warping amount adjusting part 41c according to the third example.

As shown in FIG. 13B, the intervention of the warping amount adjusting member 411 between the warping amount adjusting convex 34 provided for the rigid member 4 and the inner circumferential surface of the warping amount adjusting concave 35 on the side surface 3 of the housing 10 can warp the housing 10 so that the intermediate part in the elongated direction can be convex upward or can be concave downward. As described above, the intervention of the warping amount adjusting member 411 between the warping amount adjusting convex 34 provided for the rigid member 4 and the inner circumferential surface (in particular, the upper surface or lower surface) of the warping amount adjusting concave 35 provided for the housing 10 can hold the housing 10 in the warping state. As with the first example, the warping amount is determined according to the dimension of the warping amount adjusting member 411 in the vertical direction. Consequently, the dimension of the intervening warping amount adjusting member 411 in the vertical direction is changed, or the number of intervening warping amount adjusting members 411 is changed; such change can adjust the warping amount of the housing 10.

The positions at which the warping amount adjusting convexes 34 of the rigid member 4 and the warping amount adjusting concave 35 of the housing 10 are provided (i.e., the positions at which the warping amount adjusting part 41c according to the third example is provided) may be the same as the positions of the first example. As with the first example, multiple warping amount adjusting parts 41c according to the third embodiment may be provided.

The specific shapes of the warping amount adjusting convexes 34 provided for the rigid member 4, and the warping amount adjusting concave 35 provided for the housing 10 are not specifically limited. In short, any configuration may be adopted only if a gap in the vertical direction is provided between the outer surfaces of the warping amount adjusting convexes 34 of the rigid member 4 and the inner surfaces (the upper surface and the lower surface) of the warping amount adjusting concave 35 of the housing 10.

(Fourth Example of Warping Amount Adjusting Part)

Figure 14:
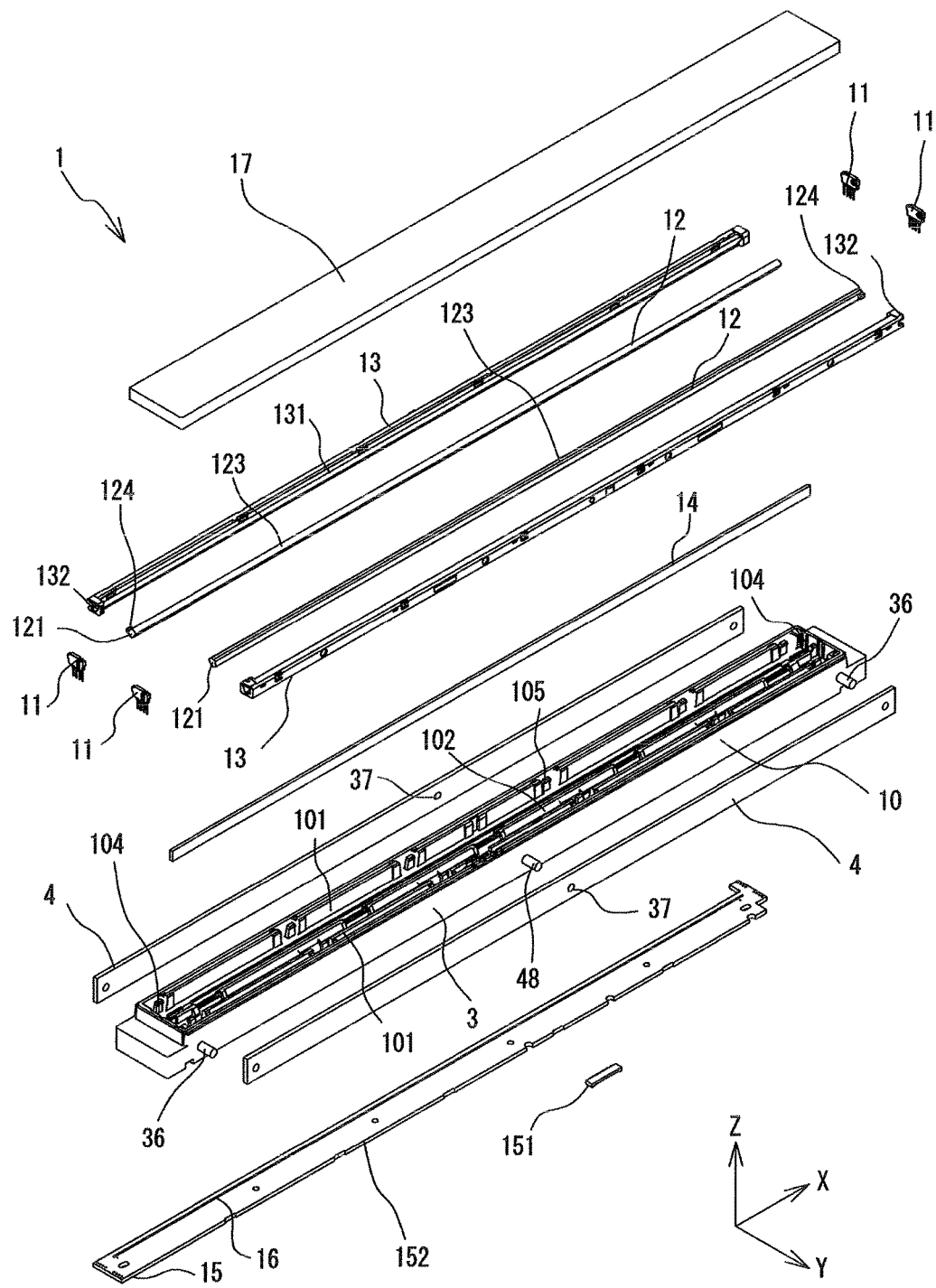
FIG. 14 is an exploded perspective view schematically showing a configuration example of an image sensor unit to which the warping amount adjusting part according to the fourth example is applied.
Figure 15A:
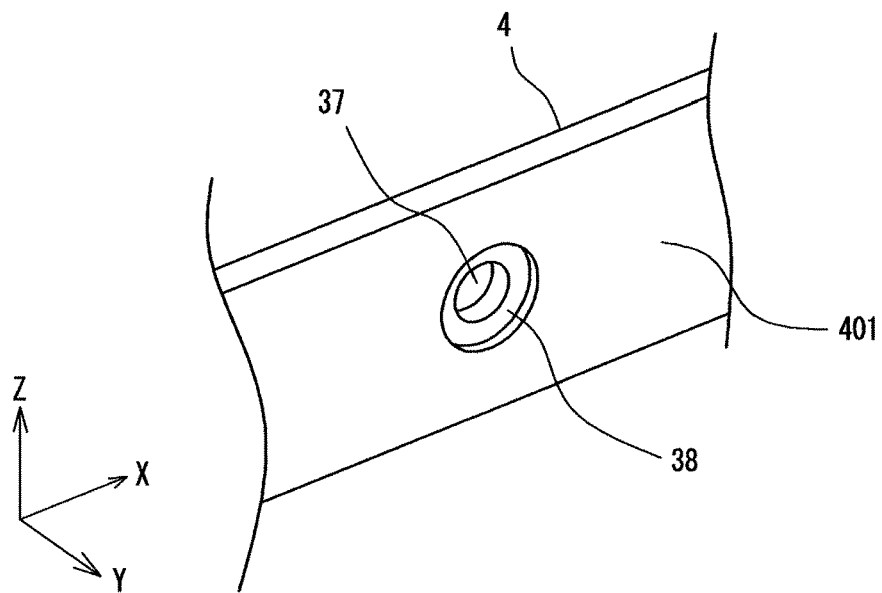
FIG. 15A is a sectional view schematically showing the configuration of the warping amount adjusting part according to the fourth example.
Figure 15B:
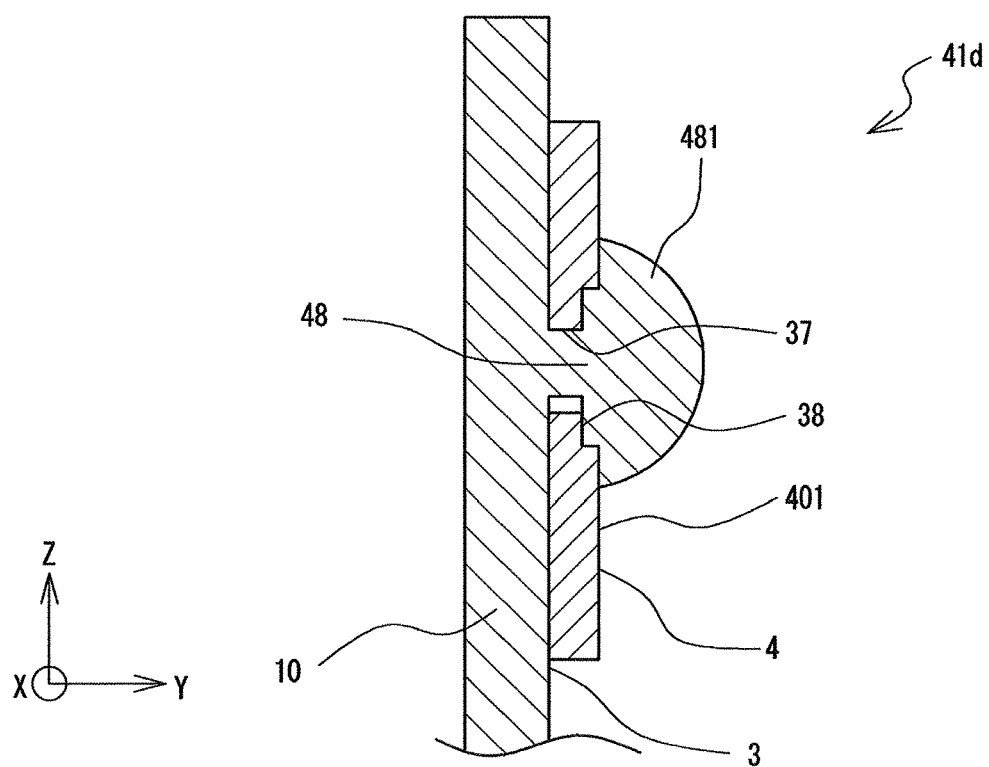
FIG. 15B is a sectional view schematically showing the configuration of the warping amount adjusting part according to the fourth example.

Next, a fourth example of the warping amount adjusting part is described with reference to FIGS. 14, 15A and 15B. FIG. 14 is an exploded perspective view schematically showing a configuration example of the image sensor unit 1 to which the warping amount adjusting part 41d according to the fourth example is applied. FIGS. 15A and 15B are diagrams schematically showing a configuration example of the warping amount adjusting part 41d according to the fourth example. FIG. 15A is an enlarged view of the rigid member 4. FIG. 15B is a sectional view of the warping amount adjusting part 41d.

The same attachment structure as that of the rigid members 4 according to each of the embodiments is applied to the warping amount adjusting part 41d according to the fourth example. FIGS. 14, 15A and 15B show an example to which the same configuration as that of the rigid members 4 according to the first example is applied. In this case, as shown in FIGS. 14, 15A and 15B, the warping amount adjusting part 41d according to the fourth example includes: a warping amount adjusting opening 37 provided at the center portion of each rigid member 4 in the elongated direction; a step portion 38 that is an example of the concave; and a warping adjusting protrusion 48 provided at each center portion of the housing 10 in the elongated direction. The warping amount adjusting opening 37 is a penetration-hole penetrating through in the Y direction in a manner analogous to that of the attachment hole 42 provided at each of the opposite ends in the elongated direction. As with the step portion 43 of the attachment hole 42, the step portion 38 serving as the example of the concave is provided around the warping amount adjusting opening 37 on the non-facing surface 401 of each rigid member 4. As with the attachment protrusion 36, the warping adjusting protrusion 48 protrudes in the Y direction from the side surface of the housing 10.

In the state where the warping amount of the housing 10 is adjusted, the distal end of the warping adjusting protrusion 48 (a part protruding from the warping amount adjusting opening 37 of the rigid members 4) is caulked. Accordingly, the warping amount of the housing 10 is held (fixed) to the adjusted amount. More specifically, the warping adjusting protrusion 48 provided for the housing 10 is inserted into the warping amount adjusting opening 37 provided for each rigid member 4, and the flange portion 481 (flange-shaped portion) is formed by caulking at the distal end of the warping adjusting protrusion 48 (the part protruding from the warping amount adjusting opening 37 of the rigid members 4). The flange portion 481 is a portion having a larger external dimensions than the other portions of the warping adjusting protrusion 48 when viewed in the protruding direction (when viewed in the Y direction). As shown in FIGS. 15A and 15B, at least a part of the flange portion 481 formed by caulking the distal end of the warping adjusting protrusion 48 is inserted into the step portion 38, and the inner circumferential surface of the step portion 38 and the flange portion 481 are in contact with each other without any gap at least in the vertical direction. According to such a configuration, even if a gap is present between a part (e.g., a base portion) of the warping adjusting protrusion 48 other than the flange portion 481 and the inner circumferential surface of the warping amount adjusting opening 37, a state is achieved where the rigid member 4 and the housing 10 cannot be relatively moved in the vertical direction at the center portion of the image sensor unit 1 in the elongated direction. Consequently, the variation in the warping amount of the housing 10 can be prevented or suppressed, and the adjusted warping amount can be held by the warping amount adjusting part 41d.

The flange portion 481 may be formed (caulked) in the state where the warping amount of the housing 10 is adjusted. Another member may intervene between the external circumferential surface of the warping adjusting protrusion 48 and the inner circumferential surface of the warping amount adjusting opening 37 to thereby adjust the warping amount of the housing 10, and the warping adjusting protrusion 48 may be caulked in this state. For example, a member, such as the warping amount adjusting member 411 (see FIGS. 11, 12A and 12B), may intervene.

The example where the same configuration as that of the attachment structure of the rigid members according to the first example is applied has been described as the configuration of the warping amount adjusting part 41*d* according the fourth example. However, there is no limitation to such a configuration. The same configuration as that of the rigid members 4 according to each of the first to fifth examples is applicable to the warping amount adjusting part 41*d*. That is, the concave provided on the non-facing surface 401 of each rigid member 4 may be the grooves 47 (see FIGS. 8A and 8B) extending in the elongated direction of the rigid member 4, the grooves 45 extending in a direction inclined from or perpendicular to the elongated direction, or a combination thereof (cross-shaped grooves, X-shaped grooves, or mesh-shaped grooved (see FIGS. 6A and 6B)). As with the attachment structure of the rigid members 4 according to the fourth example, a configuration may be adopted where the sub-holes 46 (see FIGS. 7A to 7C) are provided as the concave. As with the attachment structure of the rigid members 4 according to the second example, a configuration may be adopted where the fitting protrusion 44 (see FIGS. 5A and 5B) protruding from each non-facing surface 401 is provided around the warping amount adjusting opening 37. Any of these configurations can prevent the rigid members 4 and the housing 10 from being relatively displaced in the vertical direction at the center portion of the image sensor unit 1 in the elongated direction, and prevent the warping amount from varying. Consequently, the adjusted warping amount can be held.

When a configuration analogous to that of the attachment structure of the rigid members 4 according to the fourth and fifth examples is applied, the relative movement between the rigid members 4 and the housing 10 in the elongated direction can be allowed. In this case, if the rigid members 4 and the housing 10 are expanded or contracted in the elongated direction by change in temperature, the occurrence of the stress caused by difference in expanding and contracting amount can be prevented or suppressed (the stress can be alleviated).

The shapes of the warping amount adjusting opening 37 and the step portion 38, which is the example of the concave, are not limited to circles. For example, the shapes may be long holes elongated in the elongated direction of the rigid member 4. In short, the housing 10 and the rigid members 4 may have any shape that is not relatively displaced in the vertical direction. The relative displacement in the elongated direction may be allowed in the elongated direction.

<Other Examples of Positions of Attachment Protrusion and Warping Amount Adjusting Part>

According to the embodiments of the present invention, the configuration has been described where the attachment protrusions 36 are provided at the two sites at the opposite ends of the housing 10 in the elongated direction, each rigid member 4 is attached thereto, and each warping amount adjusting part is provided between the attachment protrusions 36 at the two sites (i.e., the center portion of the housing 10 in the elongated direction). However, the configuration is not limited to such a configuration. The positions where the attachment protrusions 36 are provided are not limited to the opposite ends of the housing 10 in the elongated direction. The number of attachment protrusions 36 provided on each side surface 3 is not limited to two. For example, a configuration may be adopted where the attachment protrusion 36 is provided at the center portion of the housing 10 in the elongated direction, and the attachment hole 42 is provided at the center portion of the rigid members 4 in the elongated direction. In this case, the configuration where the warping amount adjusting parts are respectively provided at the opposite ends of the housing 10 in the elongated direction is applicable. Such a configuration can also exert advantageous effects as described above.

The combination of the type of the attachment structure of the rigid members 4 provided at the opposite ends of the image sensor unit 1 in the elongated direction and the type of the warping amount adjusting part provided at the center portion is not specifically limited.

<Reading Operation of Image Sensor Unit>

Next, an example of a reading operation by the image sensor unit 1 to read the reading target object P is described. The image sensor unit 1 irradiates the reading target object P with light while relatively moving in the sub-scan direction with respect to the reading target object P, and reads a pattern provided on the reading target object P through the light from the reading target object P. The image sensor unit 1 may be moved with respect to the reading target object P. Alternatively, the reading target object P may be moved with respect to the image sensor unit 1.

The light source 11 sequentially turns on the light emitting elements having the respective colors. The light emitted from the light source 11 is incident on the light incident surfaces 121 provided on the opposite end surfaces of the light guide 12 and enters the inside of this light guide 12. The light having entered the inside of the light guide 12 and reached the light emission surface 123 is emitted from the light emission surface 123 toward a reading line O on the reading target object P. The light having entered the inside of the light guide 12 and reached the light diffusion surface 122 is emitted to the outside from a prism pattern provided on the light diffusion surface 122. The light diffusion surface 122 of the light guide 12 is covered with (faces) the light reflection surface 131 of the light guide cover 13. Consequently, the light emitted from the prism pattern is reflected and diffused by the light reflection surface 131 of the light guide cover 13, and re-enters the inside of the light guide 12 from the light diffusion surface 122 of the light guide 12. The re-entered light is emitted from the light emission surface 123 toward the reading line O on the reading target object P.

The reflected light from the reading target object P passes through the light condenser 14 housed in the light condenser housing part 102, and is focused on the image sensor 16 provided on the upper surface of the sensor substrate 15. The image sensor 16 converts the received light into an electric signal, and outputs the signal. The image sensor unit 1 then performs the above described operation while relatively moving in the sub-scan direction with respect to the reading target object P. Accordingly, the image sensor unit 1 can read the reading target object P.

<Paper Sheet Distinguishing Apparatus>

Next, a paper sheet distinguishing apparatus 5 to which the image sensor unit 1 is applied is described with reference to FIG. 16. FIG. 16 is a diagram schematically showing the configuration of essential parts of the paper sheet distinguishing apparatus 5, and is a diagram showing a section taken along a plane perpendicular to the main-scan direction.

The paper sheet distinguishing apparatus 5 irradiates a paper sheet that is a reading target object P, for example, a bill, with light, reads the light from the bill, and distinguishes the type of the bill and authenticates the bill using the read light. The light source 11 provided for the sensor substrate 15 of the image sensor unit 1 applied to the paper sheet distinguishing apparatus 5 can emit visible light, infrared light and ultraviolet light.

As shown in FIG. 16, the paper sheet distinguishing apparatus 5 includes: two image sensor units 1; conveyor rollers 51 that convey a bill; and a distinguishing part 52 that is wiredly connected to the connector 151 of the image sensor unit 1 and serves as distinguishing means. In the paper sheet distinguishing apparatus 5, a conveyance path A for conveying the bill in the sub-scan direction is set. The two image sensor units 1 are provided opposite to each other with the conveyance path A for the bill intervening therebetween. The upper (bill-side) focus of the light condenser 14 is set at the center of the conveyance path A in the vertical direction.

The operation of the paper sheet distinguishing apparatus 5 having such a configuration is as follows. Each of the two image sensor units 1 applied to the paper sheet distinguishing apparatus 5 reads a predetermined pattern provided on the bill as a visible light image according to the operation described above. Furthermore, an infrared image of the bill is read, and an ultraviolet image of the bill is read. Light with emitted from the light emission surface 123 of the light guide 12 of the image sensor unit 1 to the bill transmits through the bill, enters the light condenser 14 of the other image sensor unit 1, and is focused on the image sensor 16 of the other image sensor unit 1. The image sensor 16 of the image sensor unit 1 reads the received transmission light as the visible light image, the infrared image and the ultraviolet image. As described above, the paper sheet distinguishing apparatus 5 can perform reflection reading of both the surfaces of the bill, and can perform transmission reading.

Subsequently, the image distinguishing part 52 compares an authentic bill image obtained by irradiating a bill that is a preliminarily prepared authentic bill with visible light, infrared light, and ultraviolet light, with the visible light image, infrared image and ultraviolet image of the bill that are determination targets in a case of authentication, thereby authenticating the bill. This is because the bill that is an authentic bill is provided with a region whose images obtained under visible light, infrared light, and ultraviolet light are different from each other. The parts whose description and illustration are omitted may have the same configuration elements of the conventional paper sheet distinguishing apparatus. The distinguishing part 52 may have a configuration of being provided on the sensor substrate 15 of the image sensor unit 1.

Here, the configuration where the paper sheet distinguishing apparatus 5 includes the two image sensor units 1 has been exemplified. However, the paper sheet distinguishing apparatus 5 according to the embodiment of the present invention is not limited to the configuration that includes the two image sensor units 1. For example, a configuration may be adopted that includes a transmission light source instead of one of the two image sensor units 1. That is, the paper sheet distinguishing apparatus 5 may have a configuration that includes a single image sensor unit 1, and a transmission light source provided opposite to the image sensor unit 1. In this case, as with the image sensor unit 1, the transmission light source can irradiate the reading line O on the bill with linear light having a predetermined wavelength range. Such a configuration can perform reflection reading of a surface of the bill, and can perform transmission reading of the bill. Alternatively, the paper sheet distinguishing apparatus 5 may have a configuration that includes a single image sensor unit 1, and no transmission light source. In this case, the paper sheet distinguishing apparatus 5 can perform reflection reading of one surface of the bill.

In this embodiment, the configuration is described that irradiate the bill with visible light, infrared light and ultraviolet light to read the bill as the visible light image, infrared image and ultraviolet image. However, the configuration is not limited thereto. For example, a configuration may be adopted that emits one or two of the visible light, infrared light and ultraviolet light. The configuration where the bill is applied as the paper sheet that is the reading target object P has been described. However, the type of the paper sheet is not limited. For example, various securities and ID cards can be read.

<Reading Apparatus>

Figure 17:
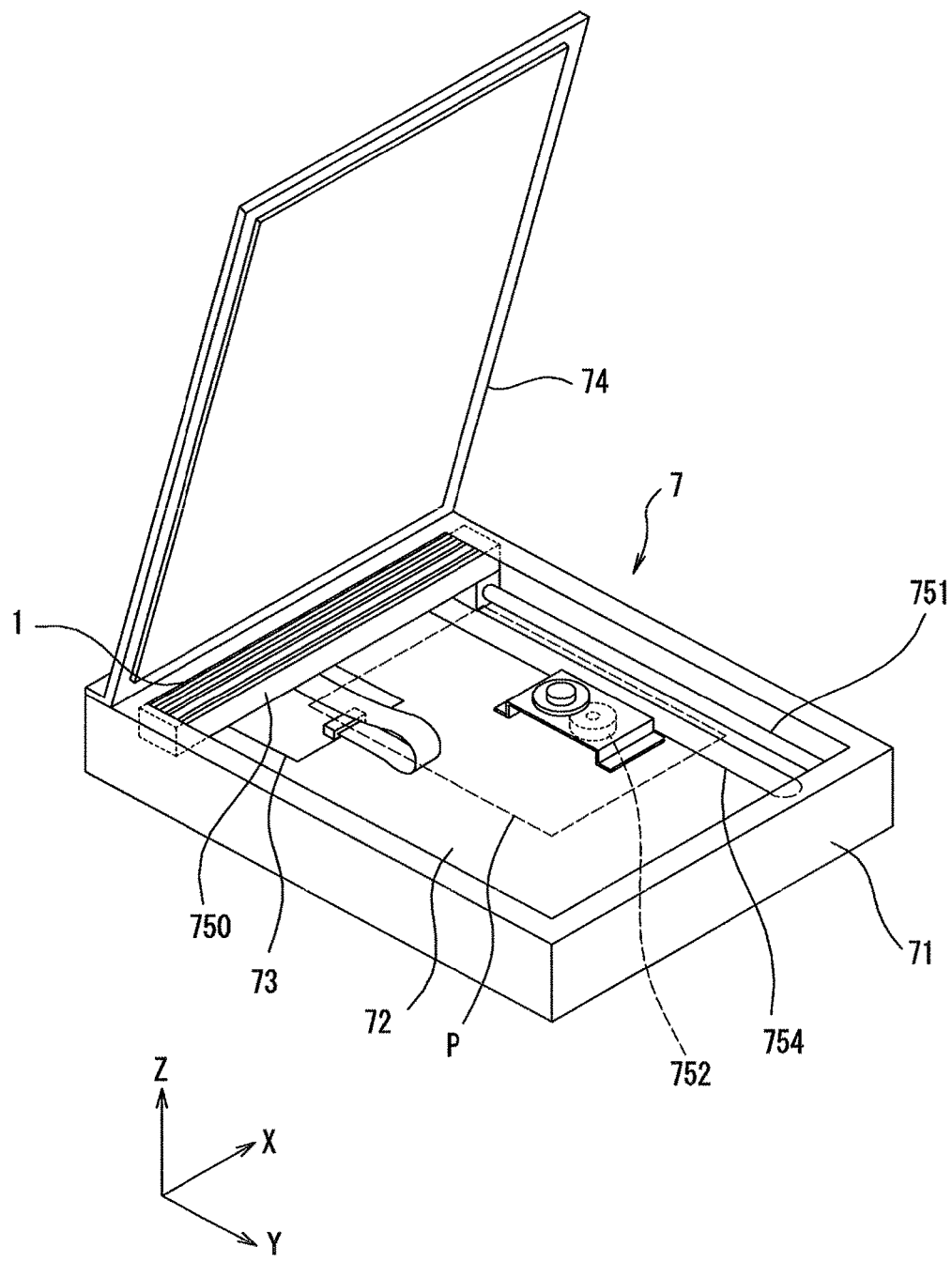
FIG. 17 is a perspective view of an appearance schematically showing a configuration example of a reading apparatus.

Next, a configuration example of a reading apparatus 7 is described with reference to FIG. 17. FIG. 17 is a perspective view schematically showing the appearance of the configuration example of the reading apparatus 7 to which the image sensor unit 1 that is an embodiment of the present invention is applicable. In this embodiment, a flatbed-type scanner is described as the reading apparatus 7. The reading apparatus 7 includes a housing 71, a platen glass that is an example of a mount member 72, an image sensor unit 1, a drive mechanism that drives the image sensor unit 1, a circuit substrate 73, and a platen cover 74. The platen glass that is the example of the mount member 72 is made up of a transparent plate, such as glass, and is attached onto the upper surface of the housing 71. The platen cover 74 is attached to the housing 71 so as to be openable and closable through a hinge mechanism and to cover the reading target object P mounted on the mount member 72. The image sensor unit 1, the drive mechanism for driving the image sensor unit 1, and the circuit substrate 73 are housed in the housing 71.

The drive mechanism includes a holding member 750, a guide shaft 751, a drive motor 752, and a wire 754. The holding member 750 holds the image sensor unit 1 so as to surround this unit. The guide shaft 751 guides the holding member 750 so that this member can move in the reading direction (sub-scan direction) along the mount member 72. The drive motor 752 and the holding member 750 are coupled to each other via the wire 754, and moves the holding member 750, which holds the image sensor unit 1, by a drive force by the drive motor 752. The image sensor unit 1 then reads the reading target object P mounted on the mount member 72 while being moved in the sub-scan direction by the drive force of the drive motor 752. As described above, the reading apparatus 7 reads the reading target object P while the image sensor unit 1 and the reading target object P are relatively moved in the sub-scan direction.

An image processing circuit that applies predetermined image processing to an image read by the image sensor unit 1, a control circuit that controls each part of the reading apparatus 7 that includes the image sensor unit 1, and a power source circuit that supplies electric power to each part of the reading apparatus 7 are constructed on the circuit substrate 73.

The flatbed-type scanner has been described as the example of the reading apparatus 7 that includes the image sensor unit 1 to which the present invention is applicable. However, the reading apparatus 7 is not limited to the flatbed-type scanner. In short, any reading apparatus may be adopted only if this apparatus has the configuration that includes the mount member 72, such as the platen glass on which the reading target object P is mounted, and reads the reading target object P while sliding the image sensor unit 1 on the mount member 72.

<Image Forming Apparatus>

Figure 18:
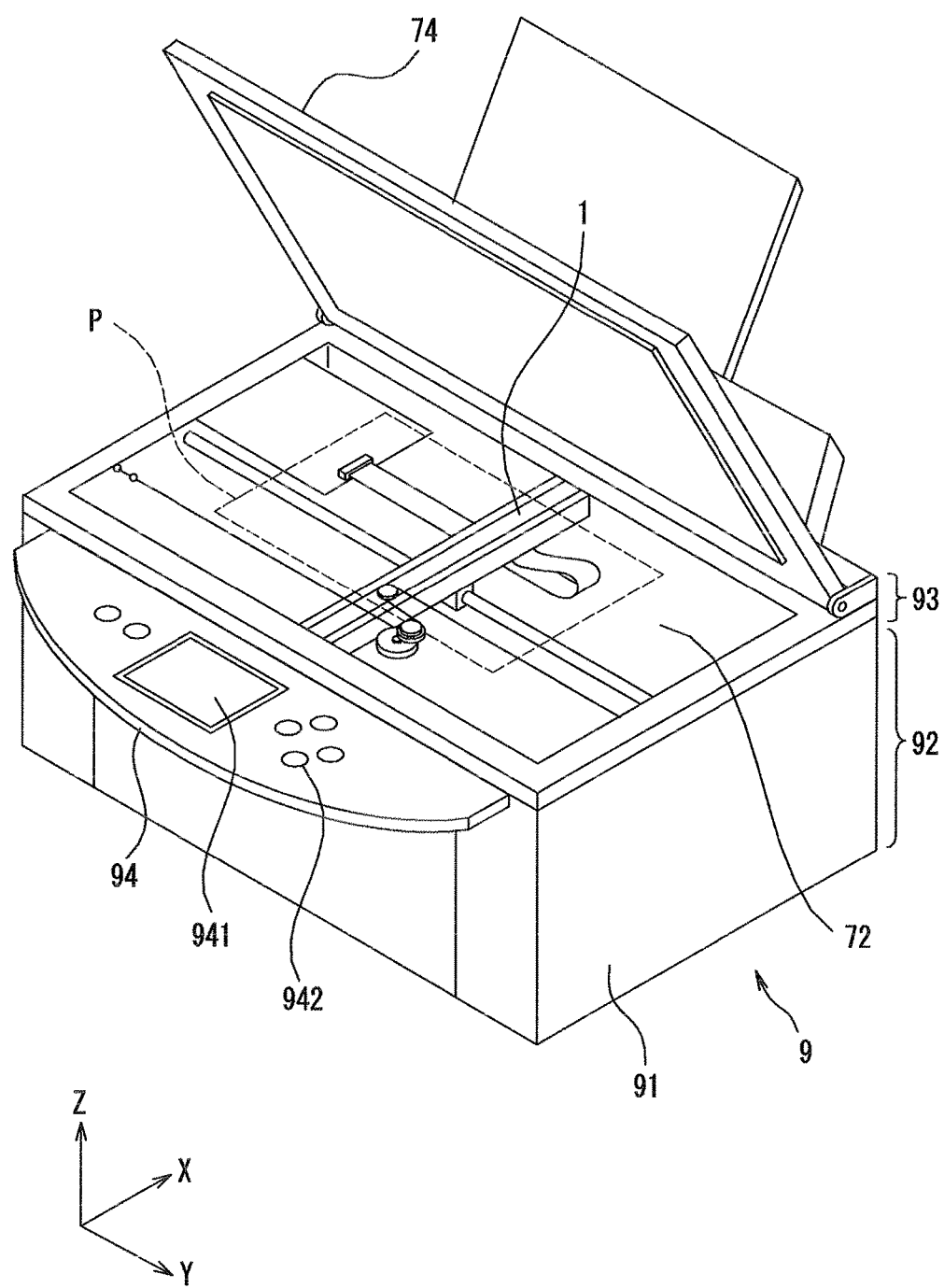
FIG. 18 is a perspective view showing an appearance of an image forming apparatus.
Figure 19:
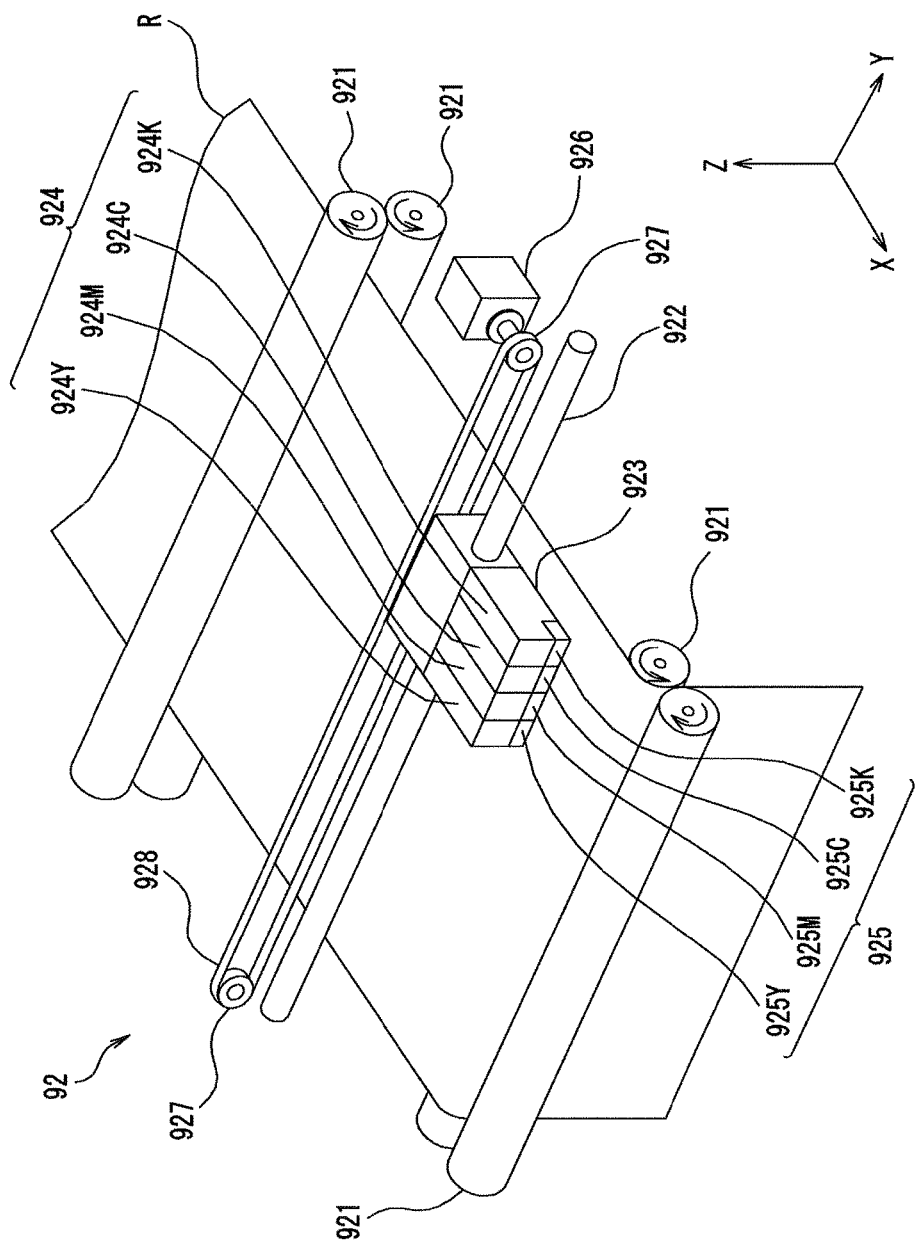
FIG. 19 is a perspective view showing an image forming part in the image forming apparatus.

Next, an image forming apparatus 9 that is an embodiment of the present invention is described with reference to FIGS. 18 and 19. The image sensor unit 1 that is the embodiment of the present invention is applied as the image forming apparatus 9 that is the embodiment of the present invention. FIG. 18 is a perspective view showing the appearance of the image forming apparatus 9. FIG. 19 is a perspective view showing an image forming part 92 provided in a housing 91 of the image forming apparatus 9 in a manner with this part being extracted. As shown in FIGS. 18 and 19, the image forming apparatus 9 is a multifunction printer (MFP) in which a flatbed-type scanner and an inkjet-type printer are combined. The image forming apparatus 9 includes an image reading part 93 as image reading means for reading an image, and an image forming part 92 as image forming means for forming an image. The image sensor unit 1 is installed in the image reading part 93 of the image forming apparatus 9. The configuration common to that of the above-described reading apparatus 7 can be applied to the image reading part 93 of the image forming apparatus 9. Consequently, description of configuration elements common to those of the reading apparatus 7 is omitted.

As shown in FIG. 18, the image forming apparatus 9 includes an operation part 94. The operation part 94 includes a display part 941 that displays an operation menu and various messages, and various operation buttons 942 for operation for the image forming apparatus 9. As shown in FIG. 19, the image forming part 92 is provided in the housing 91 of the image forming apparatus 9. The image forming part 92 includes conveyor rollers 921, a guide shaft 922, an inkjet cartridge 923, a motor 926, and a pair of timing pulleys 927. The conveyor rollers 921 are rotated by the drive force of a drive source to convey a printer sheet R as a recording medium in the sub-scan direction. The guide shaft 922 is a member having a rod-like shape, and is fixed to the housing 91 of the image forming apparatus 9 so that its axis can be parallel to the width direction of the printer sheet R.

The inkjet cartridge 923 can move to and fro in the width direction of the printer sheet R by sliding along the guide shaft 922. The inkjet cartridge 923 includes, for example, ink tanks 924 (924C, 924M, 924Y and 924K) that contain cyan C, magenta M, yellow Y, and black K inks, and discharge heads 925 (925C, 925M, 925Y and 925K) provided for the respective ink tanks 924. One of the pair of the timing pulleys 927 is attached to a rotation shaft of the motor 926. The pair of timing pulleys 927 are provided at positions apart from each other in the width direction of the printer sheet R. A timing belt 928 is wound around the pair of timing pulleys 927 in a manner of being wound parallel, and a predetermined point of this belt is coupled to the inkjet cartridge 923.

The image reading part 93 of the image forming apparatus 9 converts an image read by the image sensor unit 1 into an electric signal in a format suitable for printing. The image forming part 92 of the image forming apparatus 9 drives the conveyor rollers 921, the motor 926 and the inkjet cartridges 923, and forms an image on the printer sheet R on the basis of the electric signal converted by the image sensor unit 1 of the image reading part 93. Furthermore, the image forming part 92 of the image forming apparatus 9 can form an image on the basis of an electric signal input from the outside. The image forming part 92 in the image forming apparatus 9 may have the same configuration and operation as those of various conventionally, publicly known printers. Accordingly, the detailed description is omitted. The inkjet-type image forming apparatus has been described as the image forming part 92. Alternatively, any of the electronic photograph, thermal transfer, and dot impact types may be adopted.

The embodiments and exemplary examples of the present invention have been described above in detail. These embodiments and exemplary examples described above are only specific examples for implementation of the present invention. The technical scope of the present invention is not limited to the embodiments and exemplary examples described above. The present invention can be variously changed in a range without departing from the spirit thereof.

For example, the reading apparatus to which the present invention is applicable is not limited to the image scanner that has the configuration described in the embodiment described above. Furthermore, the image forming apparatus is not limited to the inkjet-type one. Alternatively, any of electrophotographic, thermal transfer, and dot impact types may be adopted. The apparatus is not limited to the multi-function printer described in the embodiments described above. The copier and facsimile to which the image sensor unit according to the present invention is applied are encompassed by the reading apparatus of the present invention.

The present invention is effectively utilized for the image sensor unit, and the paper sheet distinguishing apparatus, reading apparatus and image forming apparatus (e.g., the image scanner, facsimile, copier, multifunction printer, etc.) to which this image sensor unit is applied.

The present invention can reduce the warping amount of the image sensor unit.

What is claimed is:

1. An image sensor unit, comprising:
a lens array that condenses light from a target object;
an image sensor that receives the light condensed by the lens array;
an elongated housing elongated in a first direction and that supports the lens array and the image sensor, the elongated housing having a side surface extending in the first direction; and
an elongated rigid member that has a facing surface facing the side surface and an opposite surface opposite to the facing surface across a thickness of the elongated rigid member,
wherein
the elongated rigid member is provided with a penetration-hole that extends from the facing surface to the opposite surface, and the opposite surface of the elongated rigid member has a concave portion, and
a protrusion provided on the side surface extends through the penetration-hole and is positioned in the concave portion.

2. The image sensor unit according to claim 1, wherein the elongated rigid member is provided with two or more penetration-holes.

3. The image sensor unit according to claim 1, wherein the concave portion has at least one of an annular shape that encircles the penetration-hole, a plurality of grooves that extend in directions different from each other, a groove that extends in the first direction, and a hole provided at an end of an inner circumferential surface of the penetration-hole in the first direction.

4. The image sensor unit according to claim 1, wherein the concave portion is provided at at least one of opposite ends and a center portion of the opposite surface of the elongated rigid member in the first direction.

5. The image sensor unit according to claim 1, wherein the protrusion is provided at each of opposite ends of the side surface of the housing in the first direction.

6. The image sensor unit according to claim 1, wherein the protrusion is provided at a center portion of the side surface of the housing in the first direction.

7. A reading apparatus that includes an image sensor unit for reading a reading target object,
wherein the image sensor unit is the image sensor unit according to claim 1.

8. A paper sheet distinguishing apparatus that includes an image sensor unit for reading a paper sheet,
wherein the image sensor unit is the image sensor unit according to claim 1.

9. An image forming apparatus, comprising:
an image reading part provided with an image sensor unit for reading a reading target object; and
an image forming part that forms an image,
wherein the image sensor unit is the image sensor unit according to claim 1.

10. An image sensor unit that reads a reading target object by receiving light from the reading target object, comprising:
a lens array that condenses light from the reading target object;
an image sensor that receives the light condensed by the lens array;
an elongated housing elongated in a first direction and that supports the lens array and the image sensor, the elongated housing having a side surface extending in the first direction; and
an elongated rigid member that has a facing surface facing the side surface and an opposite surface opposite to the facing surface across a thickness of the elongated rigid member,
wherein
the elongated rigid member is provided with a penetration-hole that extends from the facing surface to the opposite surface, and the opposite surface of the elongated rigid member has a protrusion,
a protrusion provided on the side surface extends through the penetration-hole, and
the protrusion on the opposite surface of the rigid member extends into the protrusion on the side surface that extends through the penetration-hole.

11. The image sensor unit according to claim 10, wherein the protrusion is provided at each of opposite ends of the side surface of the housing in the first direction.

12. The image sensor unit according to claim 10, wherein the protrusion is provided at a center portion of the side surface of the housing in the first direction.

13. A paper sheet distinguishing apparatus that includes an image sensor unit for reading a paper sheet,
wherein the image sensor unit is the image sensor unit according to claim 10.

14. A reading apparatus that includes an image sensor unit for reading a reading target object,
wherein the image sensor unit is the image sensor unit according to claim 10.

15. An image forming apparatus, comprising:
an image reading part provided with an image sensor unit for reading a reading target object; and
an image forming part that forms an image,
wherein the image sensor unit is the image sensor unit according to claim 10.

* * * * *